May 25, 1965

C. E. SMITH 3,184,995

VARIABLE TRANSMISSION POWER PLANT

Filed March 25, 1963

May 25, 1965  C. E. SMITH  3,184,995
VARIABLE TRANSMISSION POWER PLANT
Filed March 25, 1963  15 Sheets-Sheet 2

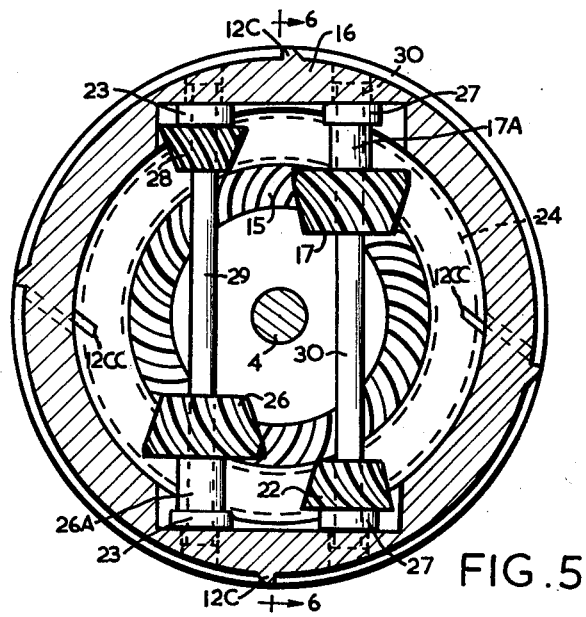
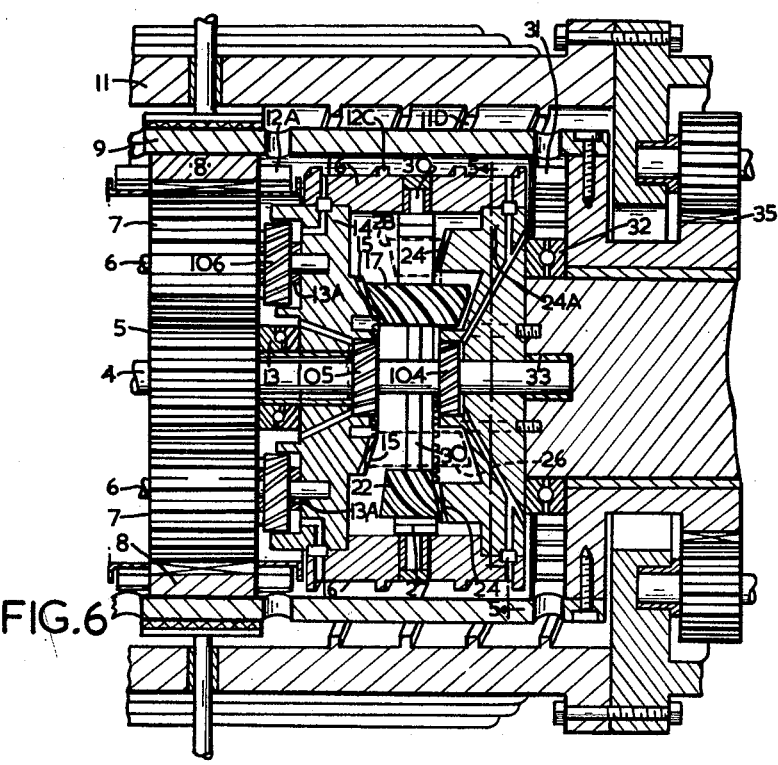

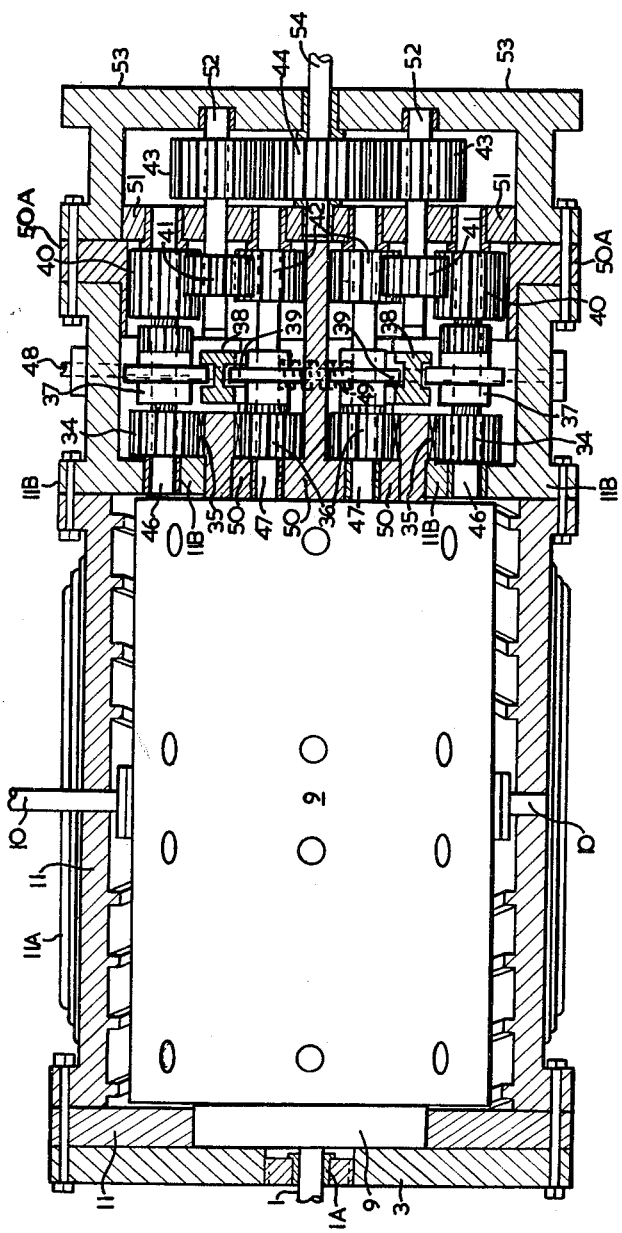

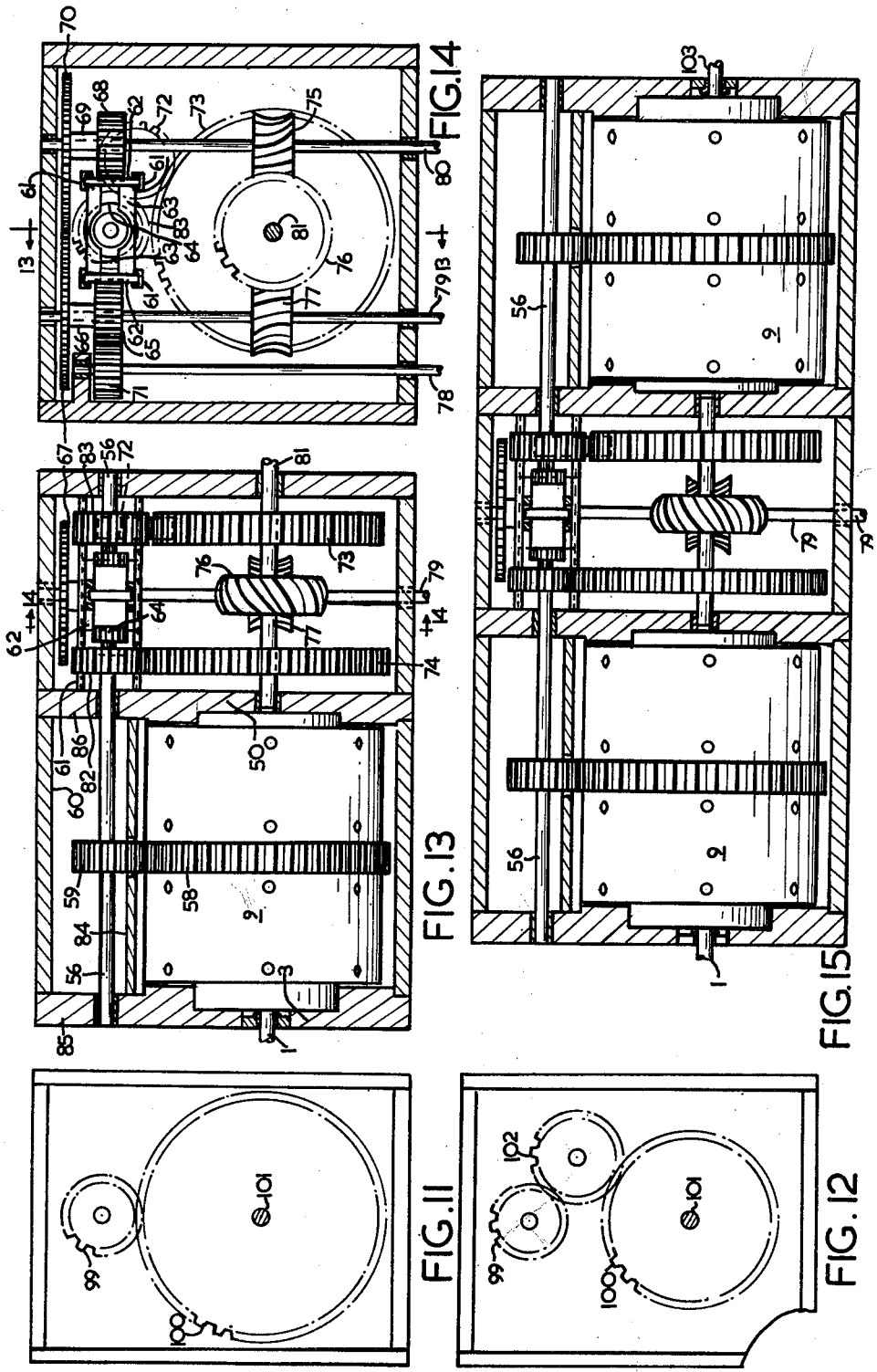

May 25, 1965 C. E. SMITH 3,184,995
VARIABLE TRANSMISSION POWER PLANT
Filed March 25, 1963 15 Sheets-Sheet 9

May 25, 1965  C. E. SMITH  3,184,995
VARIABLE TRANSMISSION POWER PLANT
Filed March 25, 1963  15 Sheets-Sheet 10

May 25, 1965 C. E. SMITH 3,184,995
VARIABLE TRANSMISSION POWER PLANT
Filed March 25, 1963 15 Sheets-Sheet 11
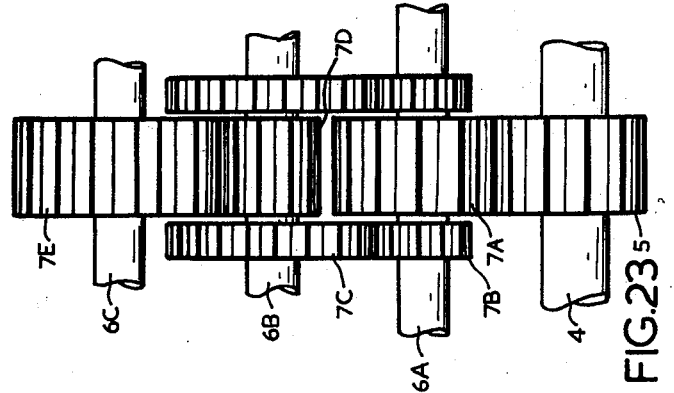
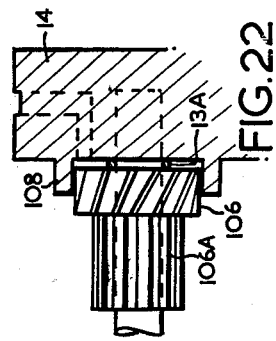
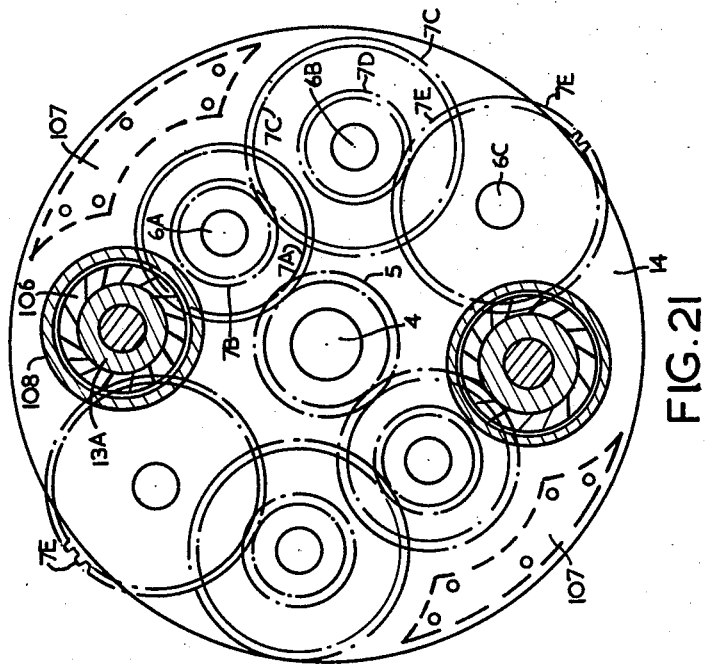

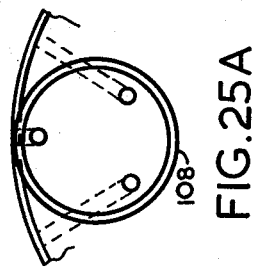
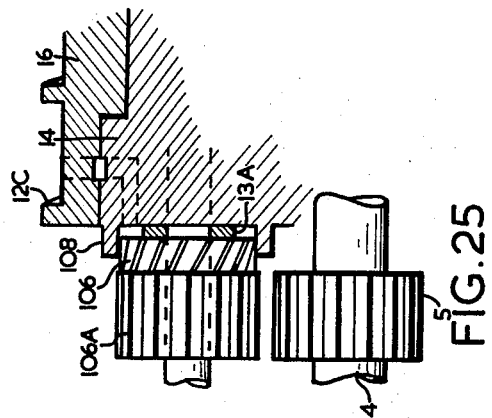
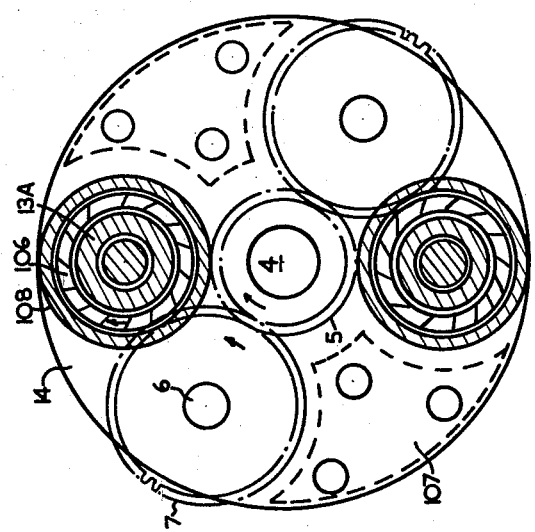

May 25, 1965  C. E. SMITH  3,184,995
VARIABLE TRANSMISSION POWER PLANT
Filed March 25, 1963  15 Sheets-Sheet 14
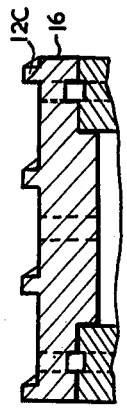
FIG. 29
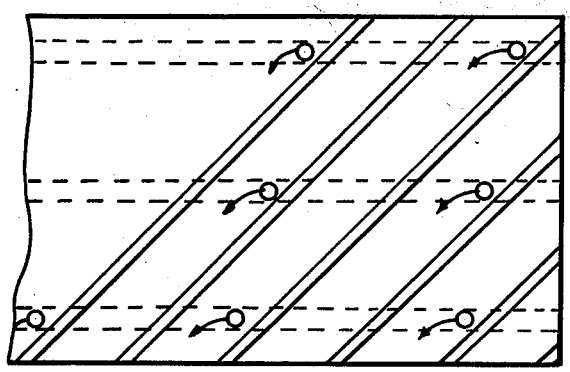
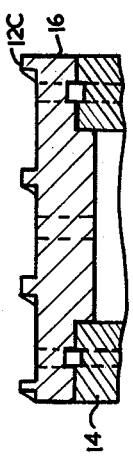
FIG. 28

United States Patent Office 3,184,995
Patented May 25, 1965

3,184,995
VARIABLE TRANSMISSION POWER PLANT
Clifford Eric Smith, 45 Abbotsford Road,
Homebush, New South Wales, Australia
Filed Mar. 25, 1963, Ser. No. 267,519
20 Claims. (Cl. 74—751)

The invention herein described relates to the transmission or use of power, force, torque or motion in such manner as to achieve or substantially achieve automatic and infinitely variable ratio between the input power, force, torque or motion and an opposing load, force or motion—in some respects sometimes referred to as automatic infinitely variable change in gear ratio.

The principal invention is referred to herein as the variable transmission power plant and is based upon a new concept in the employment of mechanical and other principles which achieve variability of ratio in transmission of power and motion between gears, wheels or objects in motion.

This invention is claimed to possess considerable advantages over any previous or existing form of "fluid" drive, mechanical or other type gear box or torque converter by providing automatic infinitely variable ratio changing transmission for either forward or reverse drive and employing mechanical principles which avoid the disabilities of "fluid" drive or mechanical mechanisms associated with stepped-gear ratio arrangements and loss of transmission with usage of considerable horse power under load. It has particular merit and advantage in applications requiring the use of driving engines or prime movers of high horse power or low operating r.p.m. and also has the advantage of infinitely variable transmission for reverse drive. It can permit the driving engine or power source to function at or within the range of its most efficient constant speed.

The variable transmission power plant comprises various separately identifiable principles, mechanisms or units having joint, separate or multiple applications, not only in this invention but in other applications and, therefore, these designs, principles, arrangements, components or mechanisms are separately and collectively patented and protected whether for use in this invention or any other invention, form or type of gear box, torque converter or other apparatus, mechanism or application.

In one general form the invention is a transmission mechanism comprising a hollow casing, an input shaft extending into the casing at one end, a sun wheel secured on the input shaft within the casing, a first fixed member forming part of the casing and surrounding the input shaft between the sun wheel and the input end of the casing, a hypoid type gear carried by the inner face of the fixed member substantially coaxial with the input shaft, a first gear carrier rotatable on the input shaft between the sun wheel and the fixed member, a hypoid type gear substantially coaxial with the input shaft carried on the face of the first gear carrier opposite the gear carrying face of the fixed member, a hollow cylindrical shaft carrier rotatable on the first fixed member and the first gear carrier and substantially coaxial with the input shaft, two spaced pinion carrier shafts in the shaft carrier between the first fixed member and the first gear carrier and rotatably mounted at their ends in the shaft carrier, two spaced hypoid type pinions on each carrier shaft, one meshing with the fixed member gear and the other with the first gear carrier gear, a second gear carrier rotatable on the input shaft on the opposite side of the sun wheel from the first gear carrier, a hypoid type gear substantially coaxial with the input shaft carried on the face of the second gear carrier remote from the sun wheel, a second fixed member surrounding the input shaft on the side of the second gear carrier remote from the sun wheel, a hypoid type gear substantially coaxial with the input shaft carried on the face of the second fixed member adjacent to the second gear carrier, a second hollow cylindrical shaft carrier similar to the first and rotatable on the second gear carrier and second fixed member and substantially coaxial with the input shaft, two additional spaced pinion carrier shafts in the second shaft carrier between the second fixed member and the second gear carrier and rotatably mounted at their ends in the second shaft carrier, two spaced hypoid type pinions on each additional shaft, one meshing with the second fixed member gear and the other with a second gear carrier gear, spaced planetary shafts substantially parallel to the input shaft and substantially equally radially spaced from it, each mounted on and between the first and second gear carriers, a planetary gear on each planetary shaft adapted to be driven by the sun gear, an output power take-off cylinder surrounding the shaft carriers and sun and planet gears and rotatable in the casing and an internal gear on the output cylinder meshing with the planetary gears.

To assist in the identification of assemblies or components which will be referred to from time to time, drawings numbered FIG. 1 to FIG. 31 inclusive are provided herewith.

FIG. 5 is a sectional elevation of a shaft carrier and associated elements on the line 5—5 of FIG. 6.

FIG. 6 is a sectional elevation on a smaller scale on the line 6—6 of FIG. 5.

FIG. 7 is a view corresponding generally to FIG. 1 but on a smaller scale and showing another alternative transmission from the output cylinder to the output shaft and including a forward and reverse mechanism, some parts being omitted to avoid repetition.

FIG. 11 is a right hand end elevation of FIG. 10.

FIG. 12 is a view corresponding to FIG. 11 but with a reversing idler gear interposed.

FIG. 13 is a modification of FIG. 10 showing a forward and reverse mechanism and partly in section on the line 13—13 of FIG. 14.

FIG. 14 is a sectional elevation on the line 14—14 of FIG. 13.

FIG. 15 shows a double input arrangement with a forward and reverse mechanism as in FIG. 13.

FIG. 21 shows in end elevation and partly in section a multiple stepped reduction from the sun gear to the planetary gears.

FIG. 22 is a fragmentary elevation at the top of FIG. 21 and at right angles to its plane.

FIG. 23 is an enlarged schematic elevation of part of FIG. 21 at right angles to its plane.

FIG. 24 corresponds to FIG. 21 but with a single step reduction.

FIG. 25 is a fragmental end elevation of part of FIG. 24.

FIG. 25A is a detail of part of FIG. 24.

Figure 26:
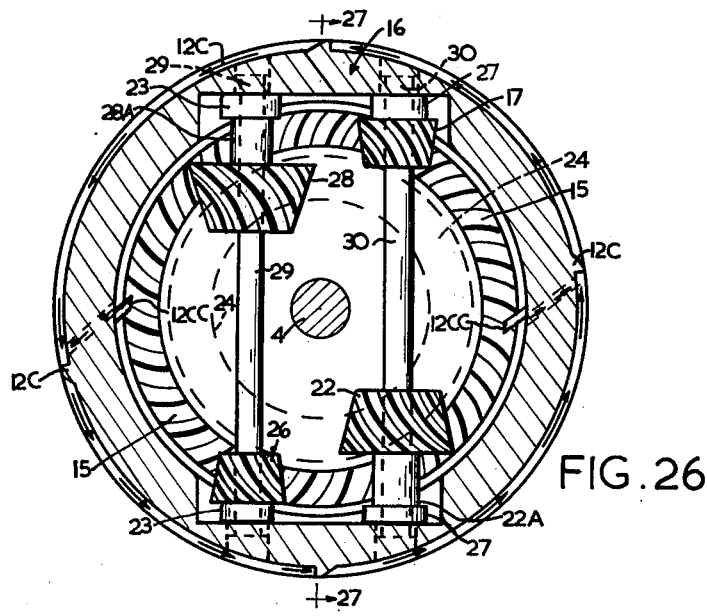

FIG. 26 is a sectional elevation of a shaft carrier and associated elements emphasizing features of a fluid circulating system.

Figure 27:
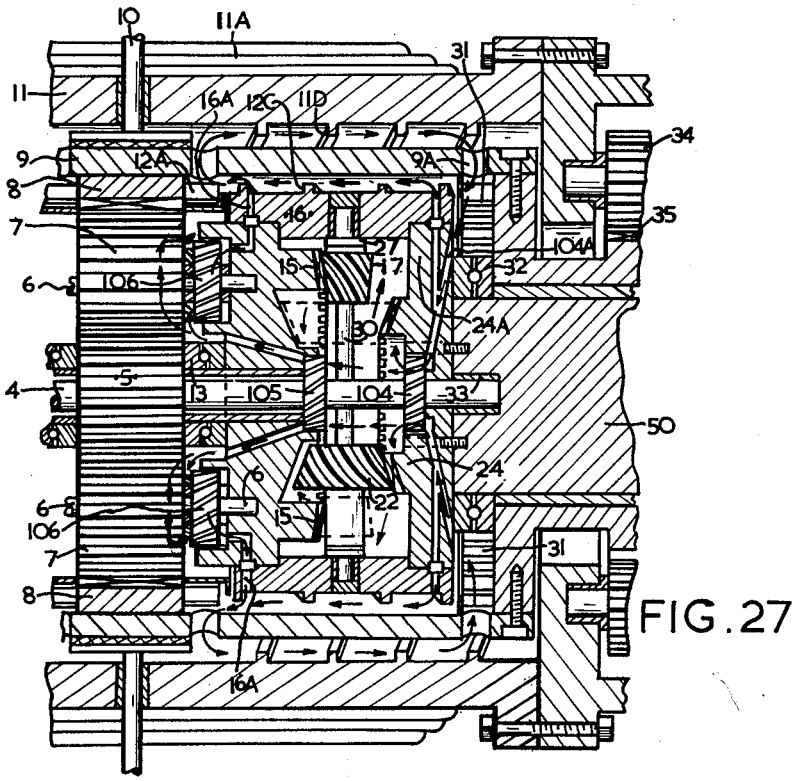

FIG. 27 is a section on a smaller scale on the line 27—27 of FIG. 26 and showing also associated elements not shown in FIG. 26.

FIG. 28 shows in half section and in part development the shaft carrier of FIGS. 5 and 6.

Figure 5A:
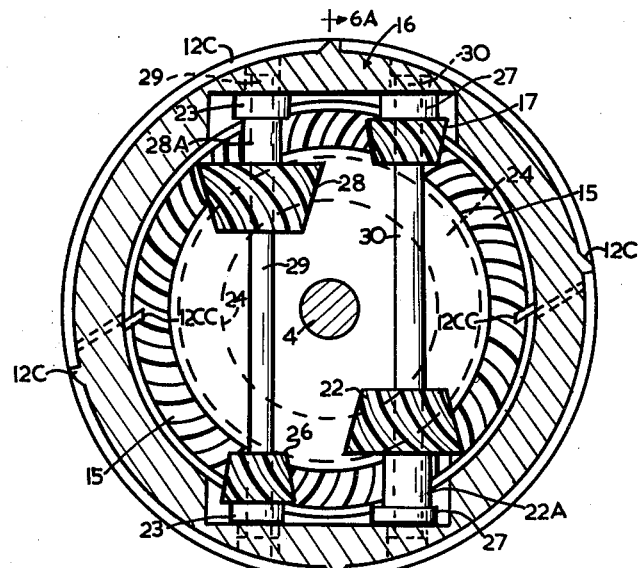
FIG. 5A shows an alternative construction to that of FIG. 5 and in section on the line 5A—5A of FIG. 6A.
Figure 6A:
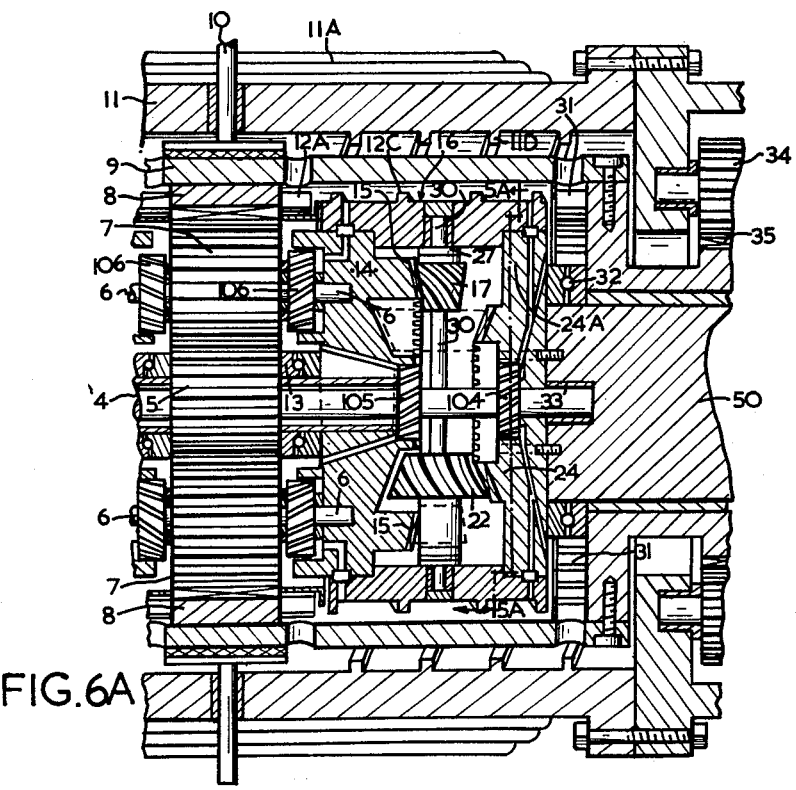
FIG. 6A is a sectional elevation on a smaller scale on the line 6A—6A of FIG. 5A.

FIG. 29 shows in half section and in part development the shaft carrier of FIGS. 5A and 6A.

Figure 30:
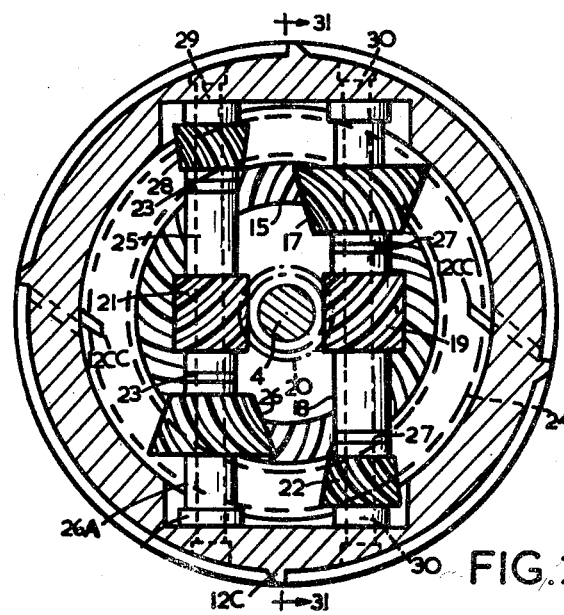
Figure 31:
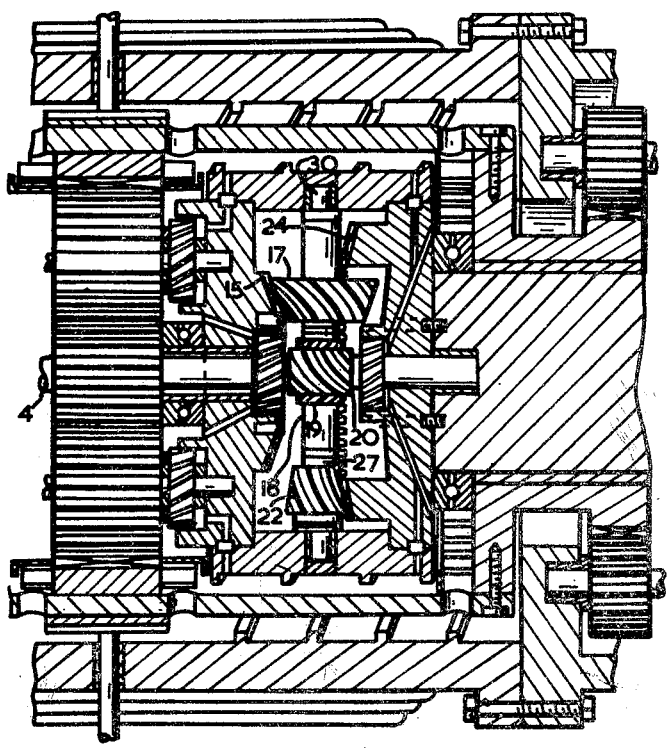

FIG. 30 shows in transverse section the addition of supplementary gears to the construction of FIG. 5, and FIG. 31 is a section on a smaller scale on the line 31—31 of FIG. 30.

The invention comprises the joint, separate or multiple use of principles, mechanisms, assemblies or units of varying types described as—

(1) The variable transmission generator.
(2) The forward or reverse transmission converter.
(3) The input-output transmission adaptor.

There are several arrangements whereby different types or forms of the mechanisms, assemblies or units identified above may be assembled or use together in various combinations and five particular such arrangements are illustrated in the attached FIGS. 7, 8, 10, 13 and 15.

The final form or arrangement will depend upon whether direct use is required of output transmission from the variable transmission generator or whether this output is required to pass through ratio adaptor gearing and/or forward and reverse transmission converter mechanism.

*The variable transmission generator*

Figure 1:
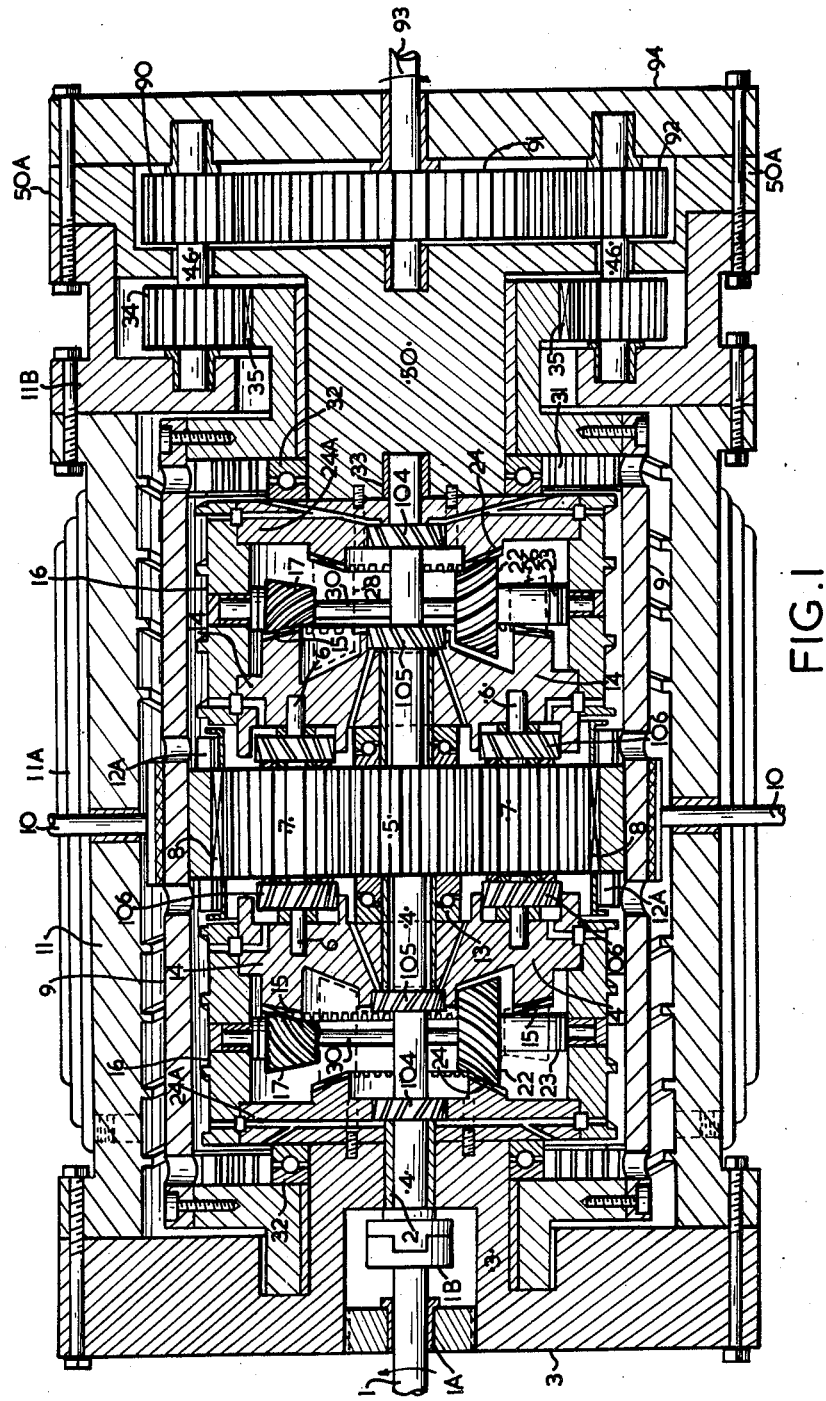
FIG. 1 is a longitudinal sectional elevation through one form of the invention showing the structure from the input shaft to the output cylinder and the subsequent transmission to the output shaft.
Figure 2:
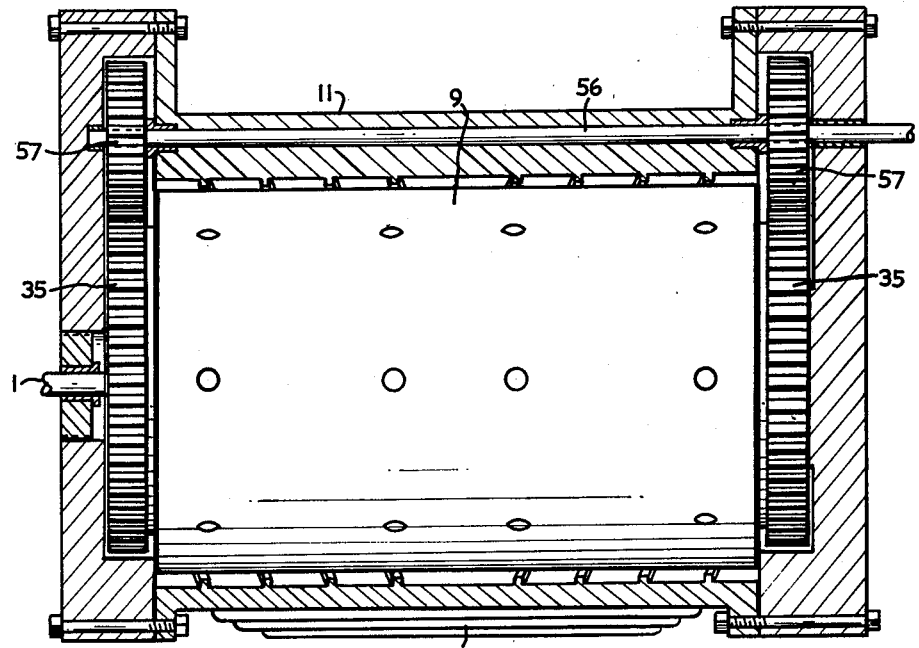
FIG. 2 is a view corresponding generally to FIG. 1 but on a smaller scale and showing an alternative transmission from the output cylinder to the output shaft and with certain parts omitted to avoid repetition.

The variable transmission generator is a mechanism, assembly or unit which receives the input of power, torque or effort and shaft r.p.m. through a "sun" or central gear and generates the internal power, forces or motions which restrain, change, impel or vary the rotation of planetary gears around the "sun" gear and thereby produce a variable output drive or r.p.m. by change of ratio in motion and/or power conveyed from the "sun" gear to an output ring gear cylindrical drive. One particular design of this mechanism is shown in FIG. 1.

The principle of achieving variation in ratio is demonstrated by observing that in a system comprising a "sun" gear, "planetary" gears and ring gear, the ratio between the "sun" gear and the ring gear can be changed infinitely according to the variation of r.p.m. with which the planetary gear shaft carrier rotates or is permitted to rotate taking its shafts and gears around the "sun" gear in either direction. The object is to generate and apply the necessary power, forces or motions which will allow and ensure that the planetary gear shafts (through their carrier) automatically vary their speed of r.p.m. around the "sun" gear in a manner as will result in or effect a change or balance in ratio between the available r.p.m. of input power and the external load or forces to be overcome by means of the ring gear which becomes a cylindrical output drive.

In the general arrangement, the outer faces of the left and right hand sides of the planetary gear shaft carrier are cut as or affixed with hypoid type gears which become drivers (with the rotation of the carrier) of pinions fixed on shafts held in a rotatable carrier. Toward the opposite end of these shafts, another set of pinions is affixed having engagement with an opposing hypoid type gear held immovable and fixed to outside members. By principles and design arrangements explained later a variable "brake" or retarding force is applied against the rotation of the planetary gear shaft carrier—power and motion thereby being conveyed through the planetary gears (free on their shafts) to the ring gear which is affixed to an output cylindrical drive. The rotation of the output cylindrical drive is infinitely variable from a position of rest to a relatively slow maximum r.p.m. This r.p.m. drive is then taken through a simple final fixed gear ratio conversion gearing to give the required enlarged or reduced final output drive r.p.m. range and this in turn is then also infinitely variable.

Several means are available for taking-off the variable transmission of power, r.p.m. or motion from the output cylindrical drive and four methods in particular are indicated on drawings of the variable transmission generator FIGS. 1, 2, 3 and 4. It should be noted that some of the take-off drives can be partly or wholly at either one or both ends of the rotating cylindrical drive or can be coupled by a common shaft or shafts with joint or multiple take-off drive at both ends. The output drives can be placed vertically, horizontally crosswise or longitudinally. Attention is directed to FIG. 15 which illustrates a particular arrangement for coupling together two independent power sources or engines to achieve a common output drive/drives. Because of the ability of the variable transmission generators to automatically adjust themselves to required ratio, each engine or power source can be of different input horse power or r.p.m. but the output is a common harmonisation thereof.

A particular form of the variable transmission generator will now be described.

A main input drive shaft 1 is driven from a power source (not shown) and enters the transmission casing through a bearing and seal 1A. The shaft 1 is coupled to a continuation input shaft 4 through coupling and decoupling plates or clutch 1B. The shaft 4 is supported in a bearing 2. A central "sun" gear 5 is affixed to the main input drive shaft 4. Rotating planetary gears 7 on shafts 6 are carried by a carrier 14 free on the shaft 4. A "ring gear cylindrical drive" consists of a ring or circumferential gear 8 affixed to a cylindrical output unit 9 having internal and/or external output drive gear(s) or other medium either partly or wholly at one or both ends or at any intermediate position. The unit 9 is rotatably mounted at its ends on internal supports 3 and 50 forming part of the casing 11. Bearings 32 take thrust between 24A and 9 near the casing ends. The "planetary" gears 7 are free to revolve on their shaft 6 which are fixed to the planetary gear shaft carrier 14. The carrier 14 is further strengthened by cross supports 107 (FIGS. 21 and 24). The "planetary" gears can be either single or multiple stepped arrangements (see FIGS. 21 to 25) between the "sun" gear 5 and the ring gear 8. With a multiple stepped arrangement the "sun" gear can be reduced or increased through "idling" free on shaft gears interposed between the "sun" gear and the "planetary" gear which has final engagement with the ring gear—a typical such arrangement being shown in FIG. 21. The directional rotation of the planetary gear shaft carrier is induced one way or the other according to the number of gear steps between the "sun" gear and the ring gear.

At one or both side of the "sun" and "planetary" gears and enclosed within the ring gear cylindrical output drive 9 are mechanisms, assemblies or components identified as rotating gear shaft reactors—a particular sectional arrangement thereof being shown in FIGS. 5 and 6 and FIGS. 5A and 6A.

The function of the rotating gear shaft reactor is to convert the rotation of the planetary gear shaft carrier 14 into a variable reaction drive which retards, holds back or controls the planetary gear shaft carrier 14 and thereby enforces a variable degree of ratio change in the transmission of input shaft r.p.m. through the "sun" gear 5 and planetary gears 7 to the ring gear 8. As the r.p.m. of the planetary gear shaft carrier 14 increase or decrease due to the effect of varied input power and/or r.p.m. related to varied external load or force applied, so the activating of the rotating gear shaft reactors increases or decreases producing a reaction or "braking" effort from hypoid pinions 17, 26 on shafts 30, 29 respectively meshing with hypoid gear 15 formed on the carrier 14 and together with forces from various vanes and blades of the fluid circulating system automatically increase or decrease their retarding control of the planetary shaft carrier 14.

Increasing power (derived from the faster "walking" of the planetary gears around the ring gear with increased input engine power and r.p.m.) is required to rotate the reactor assemblies at increasing r.p.m. until the power required is such that the external load is broken or the prime mover will stall/stop. As the outside load is broken and progressively overcome, transmission goes through the ring gear 8 by its rotation and the planetary gears then "walk" around the ring gear at less r.p.m. (thereby increasing the ratio from "sun" gear to ring gear) imparting less drive to their carrier attached gears 15 and therefore less drive to the rotating gear shaft reactor assemblies. For a constant input shaft r.p.m. the slowing of these reactor assemblies is automatically associated with increasing ratio transmission from the planetary gear to the ring gear reflecting a condition of less power being required to hold or retard the planetary gear shafts after the external load is broken. On the other hand, the fluid circulating system is such that increasing power can be required to activate the reactor assemblies with their slower r.p.m. and higher r.p.m. of the ring gear and/or the input shaft.

When the opposite situation arises whereby the external load is eliminated and changed to a return drive from the ring gear through the planetary gears to the input shaft (without engine power) then, in such case, the planetary gear shaft carrier 14 would rotate in the opposite direction than when under power load drive. The carrier 14 could then only proceed according to the degree with which the power represented in the return drive was sufficient to activate the rotating reactor assemblies. In this manner, the planetary gear shafts would be retarded and return drive would be transmitted to the prime mover/engine.

Utilising the principle that slower input shaft r.p.m. with higher ratio drive can equal higher input shaft r.p.m. with lower ratio drive, we find that the mechanical principles employed are such that, if at any point of operating, the r.p.m. of input shaft 4 is suddenly increased, the planetary gears will "walk" relatively faster and proportionately reduce the ratio drive so that there will be a smooth but positive blending of the change in output drive and also, allow the engine to increase its r.p.m. efficiently and without undue laboring.

The rotating gear shaft reactors are constructed as follows:

Two opposing hypoid type gear "wheels" 15 and 24 are formed on or attached to both faces of the rotatable carrier 14 and on fixed elements 24A centred on the main input shaft 4 which is free to rotate irrespective of these "wheels."

The inner gear "wheels" 15 of the left and right hand reactors are part of or attached to the planetary gear shaft carrier 14.

Gear "wheels" 15 with hypoid tooth form engage with pinions 17 and 26 which are fixed to their respective shafts 30, 29.

The two outer gear "wheels" 24 of the left and right hand reactors are fixed to external members 3 or 50 so that they do not move or rotate. Each outer gear "wheel" 24 of each reactor is cut or affixed with hypoid tooth form and engages with pinions 22 and 28 which are fixed to their respective shafts 30, 29 and thereby directly coupled with the opposite end pinions 17 and 26 previously described.

A rotating cylindrical carrier 16 is supported by and is free to rotate on the planetary gear shaft carrier 14 and the gear "wheel" 24A. The carrier 16 is held in position and prevented from sliding left or right by the formation of the mating bearing surfaces.

The rotating cylindrical carrier 16 holds the two shafts 29 and 30 which are free to rotate in bearings in the carrier. The pinions 17 and 22, 26 and 28 are fixed on their respective shafts 30 and 29. Sleeves 17A and 26A (FIG. 5) and 22A and 28A (FIG. 5A) transfer the thrust to end bearings 27, 23, 27, 23 respectively. The shafts 29, 30 are positioned in "hypoid" manner to either side of the main input drive shaft 4 and variously aligned from the perpendicular, i.e., at 90° to the side view of the line of input drive shaft 4 as seen in FIG. 6, to the horizontal planes by increasing or reducing angles of inclination to the gear "wheels" 15 and 24 as required for differing applications.

Figure 20:
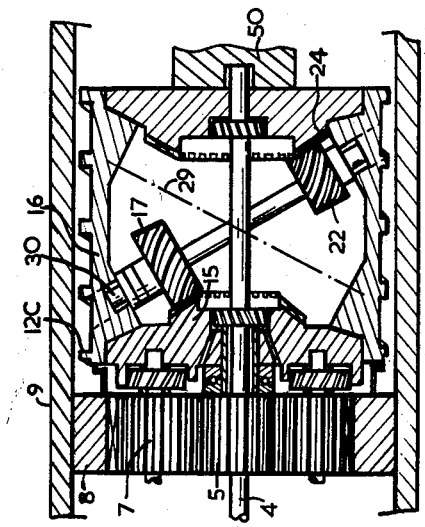
FIGS. 19 and 20 are sectional views of relative positions of the shafts carried by the shaft carrier which are different from the positions shown in FIG. 1.
Figure 19:
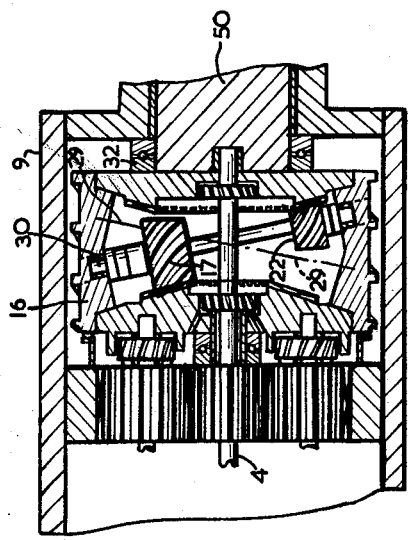

In FIGS. 1 to 7 inclusive the shafts 29 and 30 are shown perpendicular but FIGS. 19 and 20 illustrate varying inclination of these shafts to gears 15 and 24. The inclination of hypoid pinion shafts 29 and 30 can achieve the desired transmissional requirements with particular application to gear/pinion ratio relationship shown in FIGS. 5 and 6 whereby carrier 16 rotates in the opposite direction to the rotation of planetary gear shaft carrier 14. Inclination of hypoid pinion shafts 29 and 30 will permit the pinions mating with each gear "wheel" to clear the opposing gear face as the shafts and their carrier 16 rotate. With the pinion shafts perpendicular or at 90° to the side view line of input shaft 4 as seen in FIGS. 6 and 6A, either set of pinions 17, 26 or pinions 22, 28 can be larger in diameter (than the opposing pinions at the other end of their shafts) and "ride" or rotate with their circumference partly within the inner circumference of gear 24 or gear 15 whichever is the larger gear depending upon the arrangement of gear ratio selected for rotating the carrier 16 in one direction or the other.

The functioning of the rotating gear shaft reactor assemblies and other principles is as follows:

The reactor carrier 16 rotates in the opposite direction to or the same direction as the planetary gear shaft carrier 14 by pinions 22 and 28 being forced to "walk" around fixed gear 24. At the same time, through the rotation of the hypoid pinions 17 and 26, the gear wheel 15 affixed to the planetary gear shaft carrier 14 is permitted to rotate and proceed in the direction the planetary gears would want to "walk" around the ring gear when under power drive or in the reverse direction if the return drive came from external sources to rotate the ring gear 8 against the rotation of the "sun" gear. The permitted directional rotation of the reactor carrier 16 is achieved by adopting the required ratio difference between hypoid gear 15 and mating pinions 17, 26 compared with hypoid gear 24 and its mating pinions 22, 28. By way of example, it will be seen in FIG. 5 that the larger pinions 17, 26 are mated with the smaller gear 15 and the smaller pinions 22, 28 are mated with the larger gear 24—this form of ratio difference can rotate reactor carrier 16 in the opposite direction to the rotation of the planetary gear shaft carrier 14. On the other hand, FIG. 5A and FIG. 6A show the oppose arrangement where the larger pinions 22, 28 are mated with the smaller gear 24 and in this arrangement the reactor carrier 16 can rotate in the same direction as the planetary gear shaft carrier 14.

The difference in ratio between the two hypoid gears and their sets of pinions is changed or varied to allow the planetary gear shaft carrier 14 to rotate at such desired r.p.m. less than it would rotate on its own account (for the same input horse power and r.p.m.) if it was separated from the mechanism and the ring gear was held with the "sun" gear in motion. For some applications this can be achieved with a gear ratio arrangement as shown in FIG. 5 and FIG. 6 whereby the rotating carrier 16 rotates in the opposite direction to the planetary gear shaft carrier 14—this method could be associated with effective transmission being conveyed at input engine idling power/r.p.m. and therefore requiring the use of brake 10 and/or decoupling clutch 1B in association with a condition that, with increasing r.p.m. of the ring gear and decreasing r.p.m. of the planetary gear shaft carrier 14, there would at all times be effective transmission ability. In other applications it can be achieved as shown in FIG. 5A and FIG. 6A where the basic ratio arrangement is such as to allow the rotating carrier 16 to rotate in the same direction as the planetary gear shaft carrier 14—this method could be associated with no effective transmission being conveyed at engine idling power and therefore not requiring brake 10 and/or decoupling clutch 1B just to cope with this aspect because the fluid circulating system imposes an increasing brake on the rotation of carrier 16 in conjunction with increasing rotation of the ring gear and decreasing rotation of the planetary gear shaft carrier, this aspect being explained later in the section dealing with the fluid circulation system. The two arrangements are directly opposed and depending upon input horse power and r.p.m.; output r.p.m. load and other application requirements, one or the other arrangement will, in conjunction with the fluid circulating system, achieve the desired retarding or braking force required against the rotation of the planetary gear shaft carrier.

The power required to produce the "braking" forces represented in activating the rotating gear shaft reactor assemblies is derived from the "walking" of the planetary gears around the ring gear 8. As the planetary gears are free on their shafts, the latter's orbital rotation around the "sun" gear is not a direct transmission or drive from the prime mover or engine but is only a reactionary or secondary force than can be retarded or absorbed. Likewise, it should be noted that the rotating gear shaft reactor assemblies brake, retard or absorb the force represented in the rotation of the planetary gear shaft carrier—they are not being "driven" as an objective in the sense of transmitting an output drive through them.

If the planetary gear shafts are held and prevented from any orbital rotation around the "sun" gear, the movement (r.p.m.) of the "sun" gear must be able to escape through the ring gear by rotation of the planetary gears, otherwise the prime mover will stall/stop. This applies at any point between input engine idling power and fully developed power. If a decoupling or clutch mechanism is not desired as a fitment, the objective is to permit sufficient rotation of the planetary gear shaft carrier 14 at input engine idling r.p.m. to avoid stalling the prime mover and to develop the braking forces associated with increasing carrier 14 r.p.m. so that at any desired stage before maximum input engine horse power is developed, the r.p.m. of the planetary gear shaft carrier (if separated from the mechanism and the ring gear was held) would be such that the same r.p.m. of the left and right hand gears 15 activating the reactor assemblies, would require greater horse power to drive them at that r.p.m. than the prime mover/engine was then producing. In this manner the prime mover/engine can be stalled/stopped if the ring gear 8 is held immovable—thus demonstrating that full engine power can be employed. The invention also provides for the use of a usual form of decoupling clutch mechanism 1B if it is desired to effect transmission at all times when the "sun" gear 5 is in motion or it is desired to be able to operate the prime mover/engine without activating the variable transmission power plant.

The components and arrangements of the rotating gear shaft reactor assemblies and the fluid coolant/lubricating system can be designed to achieve these objectives. In between engine idling and engine maximum power/r.p.m. there is infinite variability of applied "braking" forces to retard the planetary gear shaft carrier and, therefore, infinite variability of applied gear ratio change between the "sun" gear and the ring gear. The rising curve of braking or retarding force is increased with the double effect of the left and right hand reactor assemblies.

It should be noted that the r.p.m. of the planetary gear shaft carrier 14 can be less than the r.p.m. of the "sun" gear 5. In various supporting sketches and drawings the transmission from the "sun" gear 5 to the ring gear 8 through 7 is shown as a single step but FIGS. 21 to 23 illustrate an arrangement for multiple stepped reduction of the "sun" gear r.p.m. through intermediate free planetary gears to the final planetary gear 7 having engagement with the ring gear 8. By this means a slow but low ratio rotation of the planetary gear shaft carrier is possible. This in turn means a slow but relatively powerful rotation of gear 15 to smoothly cope with the braking forces in initially operating the rotating gear shaft reactor assemblies—these reactionary braking forces are developed as increased gear 15 r.p.m. is attempted with increased input engine horse power and r.p.m. Also, with slow rotation the fluid braking forces are not developed at engine idling r.p.m.

For some applications the general principle is to convert the engine input shaft r.p.m. into a slow rotation of the planetary gear shaft carrier and achieve infinite variability through a relatively slow (also powerful) rotational r.p.m. range of the ring gear 8 and its output cylindrical drive 9 and gears. Having achieved this infinite variability from a position of rest to a known r.p.m. of the output cylindrical drive 9 and its attached gear(s) it is a simple matter to then take the transmission through fixed ratio gearing to produce the final maximum output r.p.m. required and this output r.p.m. range will then also be infinitely variable. Some forms of the final output ratio adaptor gearing are illustrated and later described under the section of the patent specification dealing with the "input-output transmission adaptor." This latter mechanism can be before or after the transmission is taken through the "forward or reverse transmission converter" and this is also dealt with later herein.

In demonstrating the effectiveness of the braking forces developed by the dual rotating gear shaft reactors and the fluid coolant/lubricating system and in explanation of the principles involved it should be noted as follows—

The rotating gear shaft reactor assembly (therefore, also the planetary gear shaft carrier 14) can only move as permitted by hypoid pinions 22, 28 "walking" around gear 24 which is fixed and held externally. If these pinions do not rotate and at the same time carry or permit their shafts to be bodily carried around the face of gear 24 there can be no movement of the planetary gear shaft carrier 14. Forces, counter forces, actions and reactions from the planetary gear shaft carrier and the rotating gear shaft reactor assembly and components are opposed unequally one against the other and the net outcome is expressed in the direction and speed of the "walking" of hypoid pinions 22 and 28 one way or the other around gear 24.

The rotating gear shaft reactor assembly (therefore, also the planetary gear shaft carrier) is immovable or movable depending upon whether there is equality of or a difference between the ratio of the two sets of hypoid pinions, e.g., 17 and 22 and their respective mating gears 15 and 24.

If these ratios are the same the mechanism is immovable by force applied to gear 15—the carrier 16 could be rotated by external force to itself but gear 15 would remain stationary as gear 24 is fixed and held immovable.

When a sufficient ratio difference is introduced the rotating gear shaft reactor assembly will rotate one direction or the other from force applied to gear 15 depending upon whether the larger or smaller ratio is associated with the fixed hypoid gear 24.

By progressively widening the ratio difference between the two pinion/gear groups, the mechanism moves away from a locked condition. In the arrangement as seen in FIG. 5 and FIG. 6 there is firstly (with small difference in ratio) relatively slow r.p.m. of gear 15 with high reverse directional r.p.m. of carrier 16—as the ratio difference in these FIGS. 5 and 6 is progressively increased with larger pinion 17, smaller gear 15 and smaller pinion 22 with larger gear 24 (bearing in mind the required respective number of gear/pinion teeth) the same horse power will rotate gear 15 at higher r.p.m. with slower reverse r.p.m. of carrier 16. In the arrangement as shown in FIG. 5A and FIG. 6A there is firstly, association of slow r.p.m. of gear 15 with fast same directional r.p.m. of carrier 16—as the ratio is widened with smaller pinion 17, larger gear 15 and larger pinion 22, smaller gear 24 the same horse power will permit gear 15 to rotate at higher r.p.m. although still less than the same directional r.p.m. of carrier 16.

The required degree of ratio difference and the desired directional rotation of carrier 16 is achieved by employing different sizes of hypoid pinions and/or their mating gears with required number and form of teeth. There is a range of dual hypoid pinion/gear ratio relationships between immovability of gear 15 and required ease of movement which permits the principles to operate for each required application, both in facilitating the movement of gear 15 (therefore, the planetary gear shaft carrier) and absorbing power in rotating the reactor assembly—this absorption of power contributing to the retardation of the planetary gear shaft carrier.

In driving the hypoid pinions 17, 26 from gear 15, the rotating gear shaft reactor assembly (therefore, also the planetary gear shaft carrier) is also immovable or movable according to the positioning of hypoid pinion shafts 29, 30 to gear 15 centre and the size of these pinions 17, 26 with their number of teeth and form thereof. Firstly, in the ratio arrangement as in FIG. 5 it will be seen that pinion shafts 29, 30 can be placed further across from gear 15 centre than usually placed for so-called operational efficiency and, therefore, the pinions acquire what might be referred to as operational inefficiency. As these shafts are moved further away from gear 15 centre, their pinions (under given design arrangements) lose rotational advantage (being driven and not "drivers") until, if they are placed at an extreme distance from gear 15 centre, they become virtually impossible of rotation from gear 15 movement as a driver—they could drive the gear but be irreversible when the opposite was attempted of the gear driving them. Secondly, with a very high ratio hypoid gear 15, pinion 17 arrangement as shown in FIG. 5A, the hypoid shafts 29, 30 could be close enough to gear 15 centre for normal operation but the pinion being so small (with few encircling spiral teeth) in relation to the size of the gear, it could be virtually impossible of being driven by the gear although here again, it could function in the reverse manner as a "driver" of the gear.

In further explanation of both situations mentioned above, it may be said that the force represented by the rotation of hypoid gear 15 divides into two opposing forces when applied in attempting to drive pinions 17, 26 and their shafts. These forces are—

(a) A pinion rotational force, and (b) A shaft thrust/force attempting to bodily carry the shafts 29, 30 around the gear 15 centre in the plane of rotation of carrier 16.

For a given tooth form, force (a)—pinion rotation—is greatest and force (b) is least when either hypoid shafts 29, 30 are nearest to gear 15 centre or pinion 17 diameter is largest from its shaft centre. As the shafts 29, 30 are placed further across gear 15 face and, therefore, further away from this gear centre, force (a) (rotational advantage) diminishes and force (b) (shaft thrust) increases. Likewise, as pinion 17 diameter is reduced, it loses rotational advantage even though the hypoid shafts are in an otherwise relatively efficient operational position to gear centre and when a very high ratio of hypoid gear/pinion drive is introduced with its small diameter pinion of parallel or near parallel taper and small number of long spiralled teeth, the pinion becomes virtually impossible of being driven by the gear.

These principles are alternately employed in using the desired hypoid gear/pinion ratio arrangements as shown in FIGS. 5 and 6 and FIGS. 5A and 6A depending upon the required application. In FIG. 5 force (a) is superior to force (b) when the pinion/gear ratio relationship is such that rotating carrier 16 rotates in the reverse direction to the planetary gear shaft carrier but in FIG. 5A force (a) is inferior to force (b) when carrier 16 rotates in the same direction as the planetary gear shaft carrier.

In the arrangement of the rotating gear shaft reactor assembly shown in FIG. 5 and FIG. 6, the leading hypoid pinions 17, 26 are positioned so that their shafts receive the required force of thrust or "locking" which would attempt to take them bodily around the centre of gear 15 with and in the direction of the movement of this gear. This attempted bodily movement of the shafts expresses itself as a force applied to hypoid pinions 22, 28 attempting to take them past the face of fixed gear 24 and therefore "walk" and rotate them around this gear 24 in the opposite direction to what they will and must "walk" and rotate due to the originating superior rotational force applied by gear 15 to pinions 17, 26.

The attempted bodily carrying around of shafts 29, 30 and the associated attempted "walking" of pinions 22, 28 around the fixed gear 24 attempts to rotate hypoid pinions 17, 26 against the rotation of gear 15. This is a braking force which must be overcome to permit the rotation of gear 15 when the gear/pinion ratios are such as to enable the rotating gear shaft reactor assembly to move backward against the directional rotation of the planetary gear shaft carrier.

As the r.p.m. of gear 15 rotation increases, the curve of thrust force applied to the hypoid shafts increases and induces a greater counter rotational braking force via pinions 17, 26 to gear 15.

Hypoid pinions 22, 28 mating with larger diameter gear 24 are in a more readily rotatable relationship or a more so-called, "efficient" positioning of operation than their opposite numbers 17, 26 mating with smaller gear 15 as seen in FIGS. 5 and 6. This introduces a difference in shaft thrust relationship between the two sets of hypoid pinions (e.g., 17–22) and their gears and permits the thrust braking principle to function because the actionary shaft thrust from pinion 17 is not equal to the reactionary effects from pinion 22. In the same manner as ratio difference of these pinions/gears achieves movement or "unlocking" and permits the rotating gear shaft reactor to rotate against or in the same direction of movement of gear 15, so also in FIG. 5 and FIG. 6 arrangement, as the diameter of gear 24 is increased beyond the diameter of gear 15 the functioning of the "braking" effect from thrust reaction is set in motion. Pinion 22 becomes a "driver" from reaction (b) (shaft thrust) mentioned previously attempting to rotate pinion 17 in the opposite direction to what it, 17, is rotated when it is driven by gear 15.

The thrust from gear 15 on hypoid pinion shafts 29, 30 and the reactionary braking effect therefrom is further increased by altering the usual mating length of hypoid pinion and width of gear so that there is additional gear tooth form on the inner circumferential edge/area of the gear 15 and additional tooth form on the outer end of the pinions 17, 26. This can be achieved by either shortening the normal length of the pinion at the inner end (without reducing the width of gear here) or adding an engaging taper on the inner circumference of the gear through which the tooth form is run through. In similar manner, the outer end of the pinion can be extended with additional material as an engaging taper through which the tooth form is run out or the external circumferential edge/area of the gear can be reduced without reducing the normal pinion length here. In both these circumstances additional area of tooth engagement is thrown on to one side of the centre line of hypoid pinion shafts 29, 30 without additional engagement on the other side thereof and without the counter equivalent reaction from opposing pinions 22, 28 and their fixed gear 24 which only have the normal mating-setting of hypoid pinion to gear but are further distant from the middle of their shaft length than pinions 17, 26 and, therefore, have greater mechanical leverage advantage as a reaction.

In FIGS. 5 and 6 this additional area of pinion/gear tooth engagement is on the side of pinion shaft centre line towards gear 15 centre. With clockwise rotation of gear 15 meeting this additional tooth form on the leading side it will be found that the thrust on the shaft is increased in excess of pinion additional rotational advantage. On the other hand, the thrust reactionary force from pinions 22, 28 as an attempted counter rotational drive of pinions 17, 26 is given advantage to increase the braking effect applied against the rotation of gear 15. As hypoid shafts 29, 30 in FIG. 5 and FIG. 6 are further across from gear 15 centre than they are in relation to gear 24 centre, it is possible to take advantage of this design characteristic because the further away from hypoid gear centre that the pinion shaft is placed, the more availability there is to increase engagement on the one side of the pinion shaft.

It should be noted that the attempted counter rotation of pinion 22 by the thrust on shaft 30 and the enforced rotation thereof (from pinion 17 rotation) both resolve themselves into a situation where the line of tooth engagement between pinion 22 and gear 24 is on the same side of each tooth—there is compatible conflict represented by the tooth line of engagement moving out along the pinion tooth instead of inwards along the same side. The two forces would endeavour to make pinion 22 driven and a "driver" at the same time—in FIG. 5 and FIG. 6 arrangement the superior force by advantage is to make it a "driver" but in FIG. 5A and FIG. 6A the superior force by advantage is to make it be driven by gear 24.

In the arrangement of the rotating gear shaft reactor assembly shown in FIG. 5A and FIG. 6A, the principle is to employ the pinion rotational force as a brake in opposing the thrust force applied to hypoid shafts 29, 30 in taking them bodily around the face of gear 15 and, therefore, making pinions 22, 28 be driven by fixed gear 24. Although gear 15 would attempt to rotate pinions 17, 26 the high ratio drive of gear to pinion, as previously referred to, can make them ineffective of rotation and, therefore, the thrust on their shafts or the "locking" carries the shafts bodily around in the same direction of rotation as gear 15. As pinions 22, 28 are then larger in diameter to their mating gear 24 (with more teeth of shorter spiral length) they will "walk" around this gear at greater speed than the same rotation of pinions 17, 26 would "walk" around their mating gear 15. This permits gear 15 to come through and follow on. The general principles and arrangement as shown in FIG. 5 and FIG. 6 apply in the reverse manner for an arrangement as shown in FIG. 5A and FIG. 6A.

The rotating gear shaft reactor (therefore, also the planetary gear shaft carrier) is also movable or immovable depending upon the line of tooth engagement and tooth action between the gears and their pinions in applying the force in gear 15 movement to the pinion either as rotational superiority or thrust superiority. The drive is from the gear to the pinion and the pinion spiral tooth form (with consequent small number of teeth) can be such that gear 15 could not rotate the pinion although the reverse drive from pinion to gear might be possible. In the ratio arrangement as shown in FIG. 5 and FIG. 6 the tooth formation and line of action is such that required shaft thrust effort is imposed whilst retaining pinion rotational advantage. In the ratio arrangement as shown in FIG. 5A and FIG. 6A tooth formation and line of action is such that shaft thrust is superior to pinion rotation although a sufficient degree of the latter force is retained to create the opposing braking force.

In each type of rotating gear shaft reactor assembly (FIGS. 5, 6 and FIGS. 5A, 6A) the two gear sizes are different, the opposing pinions are different in size and formation, the positional relationship of common shafts 29, 30 to each gear centre is different, the required number of teeth and tooth formation/line of tooth action for opposing gears and pinions is different and the mechanical leverage advantage of positioning the opposing pinions on their shafts is different. The actionary and reactionary forces involved can all be employed to produce a braking or retarding control of the planetary gear shaft carrier and there is a range within which the design characteristics for each factor can be selected to meet the requirements of each application.

Previous comments deal with mechanical principles and arrangements. The coolant/lubricating fluid system provides for the internal mechanisms to operate submerged in coolant/lubricating fluid or material completely sealed in by the outside casing. Various vanes, impeller blades and other medium induce a flow or circulation into the central area of the mechanism and then out through the wall of the rotating ring gear cylindrical drive 9 (near the ring gear) for cooling in contact with the outer casing when moving along toward each end for re-entry.

Although the system is required for cooling and lubricating the mechanism, the various vanes impeller blades and other medium can be designed with form and tolerances that produce a contributing fluid brake (of required importance) with increasing r.p.m. to supplement the mechanical brake or retardation of the planetary gear shaft carrier 14.

The circulatory system and components involved are shown in general on FIGS. 26 to 29. Entry for circulating the coolant/lubricating fluid is via openings, holes or ports 9A spaced around the cylindrical output drive unit 9 toward each end thereof. Through these openings the fluid/lubricant passes to be moved inward by pressure and/or the action of a ring of impeller blades 31 affixed to the inside surface of the cylinder 9. The fluid/lubricant is then drawn or forced through holes or ducts 104A in the internal support arm 50 entering behind fixed gear 24 and leading to a spiral grooved, toothed or bladed impeller 104 attached to the main input shaft 4 and operating in a cavity in the support arm. This impeller takes the fluid into the central area of the rotating gear shaft reactor assembly.

A similar type impeller 105 fitted to the input shaft 4 and operating in a cavity in the planetary gear shaft carrier 14 propels or forces the fluid through openings in the carrier or through a ring of spiral grooves or blades (leading to openings or holes in the carrier wall) into the central area occupied by the "sun" gear 5. A further similar type impeller 106 attached to the planetary gears or to a gear 106A driven free on a separate shaft by the planetary gears (as in FIGS. 21 to 25) propels or forces the fluid from a compression chamber or sleeve 108 back through channels or ducts in the planetary gear shaft carrier 14 and ejects it immediately at the inner bearing surface of the rotating gear shaft reactor carrier 16 where it passes through escape holes 16A in the carrier 16 then to be compressed or forced along the outside surface of the carrier 16 by spiral vanes or grooves 12C. At this point the fluid is forced into or picked up by a ring of impeller blades or vanes 12A attached to the cylindrical drive 9 and taken through openings in the wall thereof for contact cooling with the outer casing. The outer casing has spiral vanes or grooves 11D for running the fluid along the casing (by pressure or as the cylindrical drive unit 9 rotates) being cooled and taken to the ends thereof for re-entry.

In FIGS. 24, 25 and elsewhere, 13A is a thrust bearing between the gears 7 or 106A and the carrier 14.

A separate group of blades or vanes 12C are affixed to the inside surface of the rotating cylindrical carrier 16. These pick up the fluid in the outer areas enclosed by the rotating gear shaft reactor assembly and induce its movement through openings in the wall of carrier 16 where it is picked up by the spiral vanes, grooves or fins 12C previously mentioned, and also taken through the impeller blades 12A attached to the ring gear cylindrical unit 9 and thence to contact with the outer casing for recirculation.

The fins, grooves or vanes 12C attached to or formed on the outer surface of the rotating carrier 16 have a spiral pattern illustrated on FIGS. 28 and 29 to ensure that the fluid is taken along to the impeller 12A whether the carrier rotates in the same direction or the opposite direction of rotation as the output cylindrical drive unit 9.

It should be noted that in a gearing arrangement as shown in FIG. 5 and FIG. 6 the carrier 16 and cylindrical output drive unit 9 both rotate in the same direction and that the fluid pressure built up between the outer and inner surfaces respectively of these two units and the forcing of the fluid through impeller blades 12A would assist to drive or induce rotation of the ring gear cylindrical drive 9. At the same time it places a load or brake on the rotation of carrier 16 and, therefore, functions as a fluid brake supplementary to the mechanical brake. Should the r.p.m. of the ring gear cylindrical output drive 9 exceed the same directional r.p.m. of carrier 16 this fluid brake effect would be removed. The design characteristic can be such that at engine idling power and accompanying rotation of planetary gear shaft carrier 14, ring gear 8 being held, the r.p.m. of reactor carrier 16 will be such that ring gear 8 r.p.m. will not exceed or materially exceed the same r.p.m. if the planetary gear shafts were held and full engine power was developed. By this arrangement, ring gear cylindrical unit 9 (rotating in the same direction as carrier 16) will not overtake or materially exceed the speed of carrier 16 at any stage of operation. Cylindrical unit 9 will therefore not apply any effective bodily rotation of reactor carrier 16 (by fluid pressure against vanes or blades 12C) attempting to drive the planetary gear shaft carrier 14 in the direction it would rotate when the planetary gears "walk" around the ring gear under low ratio power drive. The fluid pressure and circulation (from vanes 12C) would then always be taken to impeller 12A except under circumstances when there was a reverse drive from external sources (without engine power) to rotate the planetary gear shaft carrier 14 in the opposite direction to what it rotates under low ratio power drive. In this case, the fluid movement would be temporarily taken to the opposite end of the surface of carrier 16 and circulated by enforced re-entry through the holes or ducts through carrier 16 wall as seen to the right hand side of this carrier as in drawing FIG. 6. This will be compatible with the circumstances that the mechanism is then not under power drive from the prime mover. The design characteristics to achieve these objectives can be such that at engine idling power, the planetary gear shaft carrier 14 rotates at slow r.p.m. (if necessary using a stepped planetary gear reduction arrangement such as illustrated on drawing FIG. 21) with relatively fast reverse r.p.m. of rotating carrier 16.

On the other hand, with the gear ratio arrangement as indicated in drawings FIG. 5A and FIG. 6A the carrier 16 rotates in the opposite direction to the cylindrical output drive unit 9. In this case the fluid pressures again initially function as a supplementary brake retarding rotation of carrier 16 whilst inducing rotation of the ring gear 8 with adoption of the appropriate angle of impeller blade 12A formation to receive the impact of the movement of fluid through them as induced by the vanes 12C. However, as the outside load is broken and transmission goes through (with rotation of the ring gear 8) this brake effect is increased with decreasing rotation of carrier 16—this cycle continues with higher ratio output drive until carrier 16 could, in effect, be rotated in the reverse direction by external force to its exterior surface represented by the "drag" or force applied by the fluid to its vanes as induced by rotation of the cylindrical output drive casing 9. This reverse rotation of carrier 16 would "walk" pinions 22, 28 around fixed gear 24 and take gear 15 and its carrier back (in the opposite direction to that applying when under low gear ratio drive) thus increasing the ratio drive from "sun" gear 5 to ring gear 8. The principle here is that there is a constant balancing of ratio between the "sun" gear input power/r.p.m. and output drive achievement of the ring gear in overcoming or receiving varying outside load/forces. The important point to note in this arrangement is that with transmission going through the output drive, increasing power is required to motivate the reactor assemblies despite the fact that their r.p.m. is reducing—this means that slower r.p.m. of the planetary gear shaft carrier 14 requires greater power from its rotation to motivate the two reactor assemblies at their slower r.p.m.

Apart from the contributing braking or retarding forces that can be developed by the fluid circulating system, the invention provides for the addition of another feature, if required, as illustrated in FIG. 30 whereby a central gear 20 can be fixed to the input shaft 4 between the two hypoid shafts 29, 30 and engage with two gears 19, 21 fitted free on these shafts. Gears 19, 20, 21 are preferably spiral gears with crossed axes. These gears 19, 21 are affixed to sleeves 18, 25 (also free on shaft) and the thrust is taken down to the inner end of pinions 22, 28. Between the end of the sleeve and the pinion, double bearings 23, 27 separated with dividing plates are fitted. The thrust from the action of gear 20 engaging gears 19, 21 can be increased according to the angle or line of tooth form. This thrust (increases with increasing engine input power/r.p.m.) applies a load against the rotation of pinions 22, 28 and applies a contributing braking effort against the rotation of carrier 16. It is to be noted that as the reactor carrier 16 and its pinion shafts rotate in one direction or the other around the input shaft drive gear 20, the ratio between it and gears 19, 21 is automatically infinitely varied.

If required to arrest any initial movement (with engine idling) of the cylindrical output drive 9, the invention provides for a brake 10 adjustable to the degree of "holding" that may be required, to be applied to the external surface of the cylindrical drive 9. The brake release can be by leverage or other action directly coupled to the driving engine accelerator pedal or power control so that when operating power is supplied by the engine or power source, this brake is immediately released and the cylindrical output gear drive is free to function. This brake 10 is fitted separately or supplementary to the decoupling clutch 1B previously described.

Main thrust bearings 13 are provided at either side of the "sun" gear. Main shaft bearings 2 and 33 have been provided for input shaft 4 which terminates at bearing 33. Other bearings are provided as required for all bearing surfaces and thrust faces.

The variable transmission generator mechanism is enclosed in a cylindrical casing which is fitted with cooling fins 11A as required. In certain applications the external casing is modified or fitted with supplementary sections for accommodating and suiting the different methods of taking-off the drive from the cylindrical output drive 9.

The variable transmission generator or power plant can be attached to the equipment or unit with which it is installed by various means including fixing plates or brackets 55 attached to the outer casing. These fixing plates or brackets can be of such shape and positioned at any degree to give the angle of holding or fixing as may be required. If required, the invention provides for the addition of different types of front end units so that direct fixed reduction or constant speed gear drives can be taken off irrespective of the variable transmission output drive/drives. These front end units can utilise engine input shaft r.p.m. to give subsidiary drives for auxiliary or other purposes. Alternatively, the input power can be brought in by radially disposed shafts keying in with a central drive gear affixed to the main input shaft.

Figure 3:
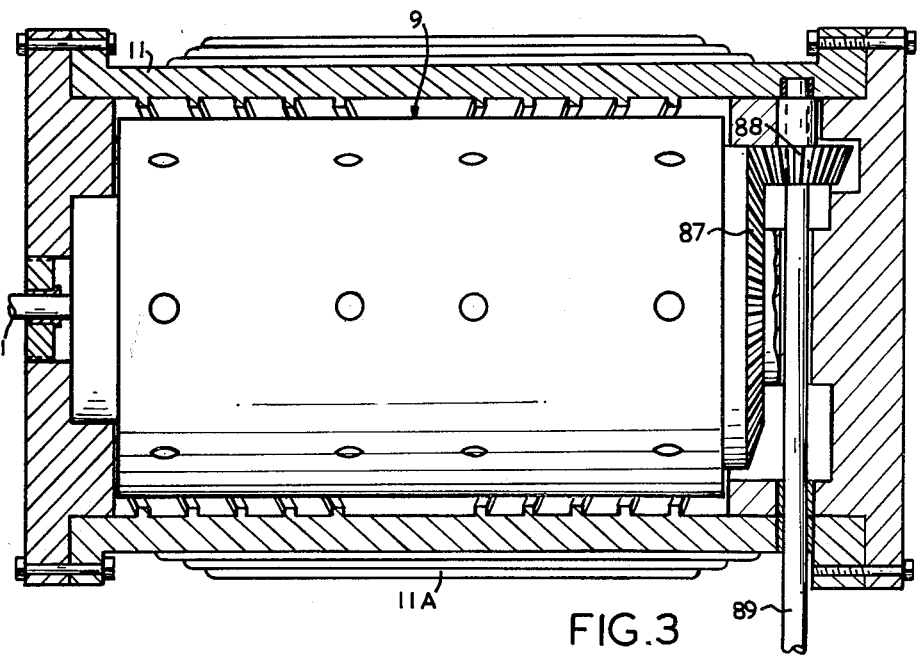
FIG. 3 is a view corresponding generally to FIG. 2 but showing a second alternative transmission from the output cylinder to the output shaft.
Figure 4:
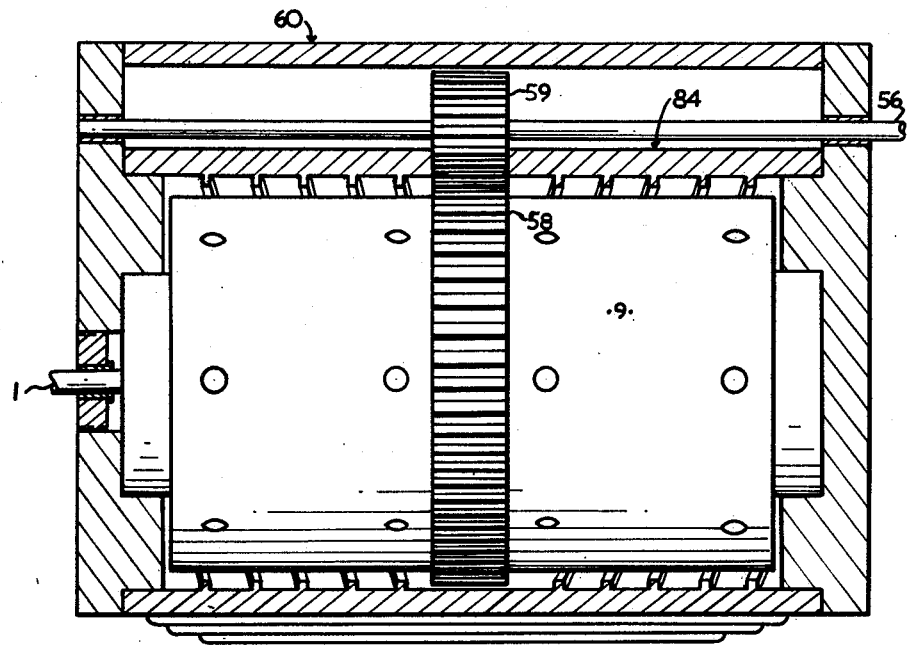
FIG. 4 is a view corresponding generally to FIG. 2 but showing a third alternative transmission from the output cylinder to the output shaft.
Figure 9:
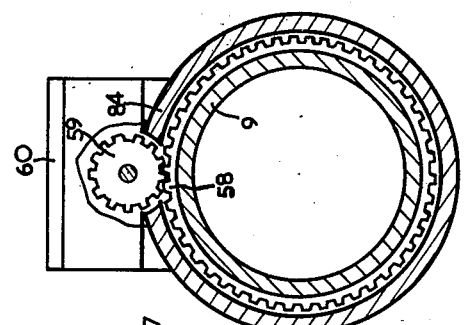
FIG. 9 is a section on the line 9—9 of FIG. 10 showing another alternative transmission from the output cylinder to the output shaft.

As previously mentioned, there are various methods for taking-off the output drive from cylindrical drive unit 9 and conveying this drive to output shafts. Four particular such methods are illustrated in FIGS. 1, 2, 3 and 4. In FIG. 1 a ring gear 35 cut with external or internal teeth, is affixed at one or both ends of the cylindrical drive unit 9. In this case, gear 35 can drive one or both of gears 34 affixed to shaft(s) 46. Shaft 46 can then be extended through the end casing for take-off drive usage. Alternatively, cavities can be provided in the outer end section 50A of the internal support arm 50 and in these cavities ratio changing and/or rotational direction changing gears 90, 91, 92 can be fitted to take the final output drive from shaft 93 through an added outer casing end plate 94. If the take-off drive employs the internal teeth of gear 35 then cavities in end support 50 provide the space for locating the engaging gears as illustrated in drawings FIG. 7 and FIG. 17. For the purpose of take-off drive arrangements illustrated in FIG. 4 and FIGS. 9 and 10, the method is to affix a centrally located external ring gear 58 to the cylindrical drive 9 and provide an opening in casing member 11 or 84 sufficient to give gear 59 access to gear 58. A supplementary external casing section 60 is fitted with modified end casing members to provide a compartment for gear 59 and its shafting 56 which may be carried through the end casing either forward or backward or both ways. FIG. 3 illustrates another particular method of taking-off the drive from cylindrical drive unit 9—in this case a hypoid or bevel type gear 87 is affixed to the end face of cylindrical drive unit 9 and conveys the drive to a hypoid or bevel pinion 88 and output shaft 89. These gears, pinions and shafts can be fitted for operation at either one or both ends of the variable transmission generator. Output drives such as in FIG. 2 can be effected at both ends of the cylindrical drive unit 9 and coupled together by common shafting fitted externally or internally to the casing body.

*Variable transmission converter*

The mechanism or unit employed to achieve controlled forward or reverse transmission is identified as the "forward or reverse transmission converter." Various types or forms of this mechanism can be provided as a coupled adjunct to the variable transmission generator and drawings FIGS. 7, 17, 18 and 13, 14 illustrate two particular forms and designs which can be employed if controlled forward or reverse variable transmission is required. These mechanisms and the principles employed are patented in their application to the principal invention described as the "variable transmission power plant" and also in their application to other mechanisms and appliances.

Figure 18:
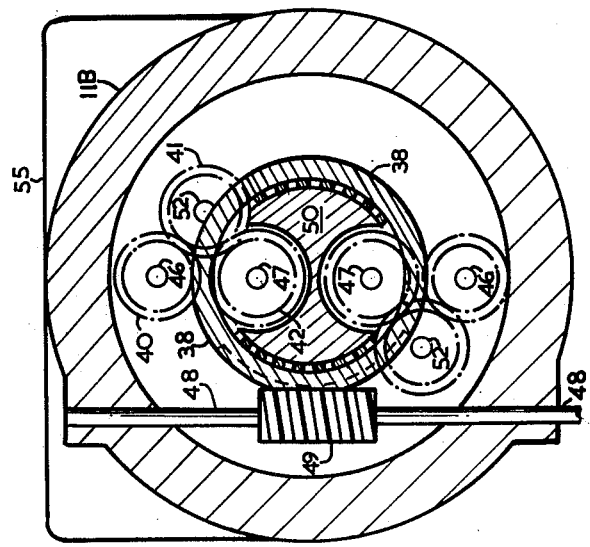
FIG. 18 is a part sectional elevation on the line 18—18 of FIG. 17 with some parts omitted for clarity.
Figure 17:
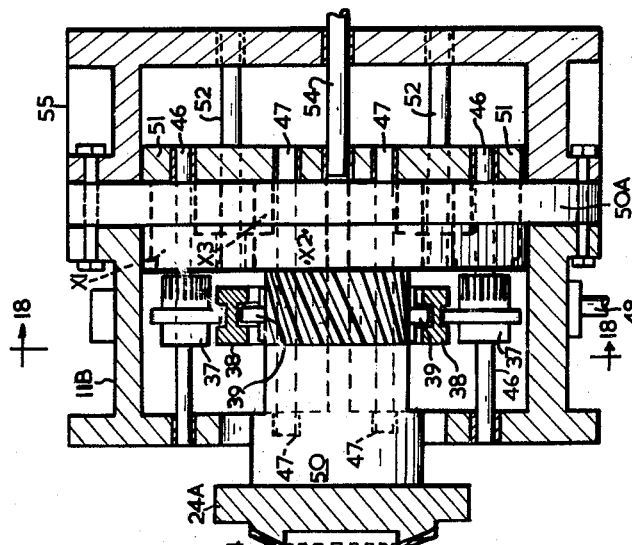
FIG. 17 is an additional view of portion of the same forward and reverse mechanism with some parts omitted for clarity.
Figure 16:
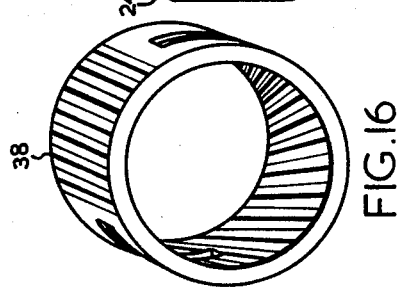
FIG. 16 is a perspective view of a control ring forming part of the forward and reverse mechanism of FIG. 7.

In drawing FIG. 7 and sectional drawings FIGS. 17 and 18, the general arrangement is to achieve forward or reverse transmission by taking-off the drive or torque from a dual purpose external/internal ring gear 35 attached at the end of cylindrical drive 9.

By dual sets of gears 34, 36 radially disposed to achieve balanced loading, a constant forward and reverse drive is available from the external/internal ring gear. This drive is conveyed through separate shafts 46, 47 which are held by casing members 11B, 51 or enclosed in the central round internal supporting arm 50, 50A containing cavities X1, X2, X3 for the reverse or opposite rotational transmission. Each shaft 46, 47 respectively carries two gears 34, 40 and 42, 36 (one 34 or 42 fixed to each shaft, one 40 or 36 free on each shaft) and between the gears an engaging "dog" 37 or 39 or "clutch" which is moved back and forth along each shaft on a spiral keyway by a control ring 38 which itself is taken back and forth by a spiral rotational motion induced by the action of a form of reversible or irreversible worm gear drive 49 operated by external partial rotation of its shaft 48.

By this means the "dogs" 37, 39 or "clutches" are brought into engagement or disengagement to lock either the free forward gear 40 or the free reverse gear 36 to their respective shafts 46, 47 and thereby either gear 40 or gear 42 conveys the transmission of motion through a shaft 52 and its attached gear 41 to a final output drive shaft either direct or through a set of input-output adaptor gears 43, 44 enclosed in a separate compartment by an added end casing member 53. There could be three positions of the controls—forward, neutral, reverse—representing the engagement or disengagement of "dogs" 37 or 39 with gears 40 or 36.

As an alternate method to that previously described, the forward or reverse transmission converter is developed as illustrated in FIGS. 13 and 14. In this case, the method of achieving direct or forward/reverse output drive is to extend shaft 56 which is held by casing member 85, 86 and add two gear wheels 82, 83 (free on their shaft) sufficiently spaced apart to accommodate between them an engaging "dog" 64 which is movable along the shaft on straight or spiral splines or keyways and is taken back or forth by arms 63 of an activator which consists principally of a supporting channel or track 61 (parallel on each side of shaft 56) on which is fitted a movable rack 62 having teeth on the outside in engagement with gears 65 and 68. Shafts 79 and 80 are provided for fitting gears 65 and 68 which have engagement with the teeth of this rack 62 and are free on their shafts with sleeves 66 and 69 joining them respectively to gears 67 and 70 which have engagement together above this sectional group of mechanism and thereby ensure joint movement of the activating arms both sides of the "dog" 64. Shaft 78 (fitted with gear 71 fixed to shaft and engaging gear 65) is carried through the casing so that by external movement of shaft 78 it rotates gear 65 in one direction or the other.

Depending upon the direction of rotation of gears 65 and 68 the rack 62 is taken forward or backward and thereby the arms 63 bearing upon either side of a straight flange on the "dog" or clutch 64 take it forward or backward for engagement with either gear 82 or 83. This imparts shaft 56 rotation to either of such gears.

Gear 82 engages gear 74 which is fixed to shaft 81. Gear 83 engages gear 72 being free on its shaft and this gear then engages gear 73 which is fixed to shaft 81. By this means gear 74 will drive shaft 81 in the opposite direction to what it will be driven by gear 73.

Shaft 81 can then be taken out through the end casing if this method of take-off is required.

Alternatively, gear 76 can be fixed to shaft 81 and then drive gears 77 and/or 75 fixed to their shafts. These shafts can be taken out vertically (or crosswise) above or below (left or right) of the casing to give the take-off output drive—again with forward or reverse if required.

Shafts 79 and 80 can terminate in bearings in the casing if output drive is not required therefrom. In such case, gears 76, 77, 75 are not fitted. It is to be noted that each set of forward—reverse control gears 65, 67 and 68, 70 fitted to shafts 79 and 80 respectively are free on their shafts.

Throughout this gearing arrangement the desired output r.p.m. can be achieved by varying the ratio, size or number of gears.

If forward-reverse output drive is not required, vertical or crosswise output take-off can be achieved by using one set of gears illustrated on FIGS. 13 and 14 and eliminating the control mechanism for forward-reverse motion. Alternatively, the transmission adaptor arrangement as shown on FIGS. 10, 11 and 12 can be employed.

In FIG. 15 two units with input shafts 1 and 103 are used to transfer motion to output cylinders and thence through shafts 56 and a forward and reverse mechanism as in FIGS. 13 and 14 to an output shaft 79.

*Input-output adaptor*

The function of this unit of the "variable transmission power plant" is to achieve the required relationship between the maximum r.p.m. of the ring gear cylindrical output drive 9 or its take-off gears and the desired final output shaft maximum r.p.m.

The variable transmission generator achieves infinitely variable ratio between the degree of low ratio required up to a maximum r.p.m. as previously described. The input-output adaptor ensures by simple variation of final stage fixed gear ratio that the final output shaft r.p.m. will, therefore, also perform with similar variability through to desired maximum final output shaft r.p.m.

In applications requiring variable transmission in one direction only, the forward and reverse changing mechanism is eliminated as shown in FIGS. 1, 2, 3, 4, 8, 10 with provision for direct drive from the cylindrical drive 9 by its alternatively attached gears 35, 87 or 58. The transmission is then taken through variously associated take-off drive gears 34, 57, 59, 88, either direct to final output shafts 56, 89, 93, 97, 101 or through intermediate ratio changing gears 90, 91, 92, 95, 96, 99, 100 to such final output shafts.

Figure 8:
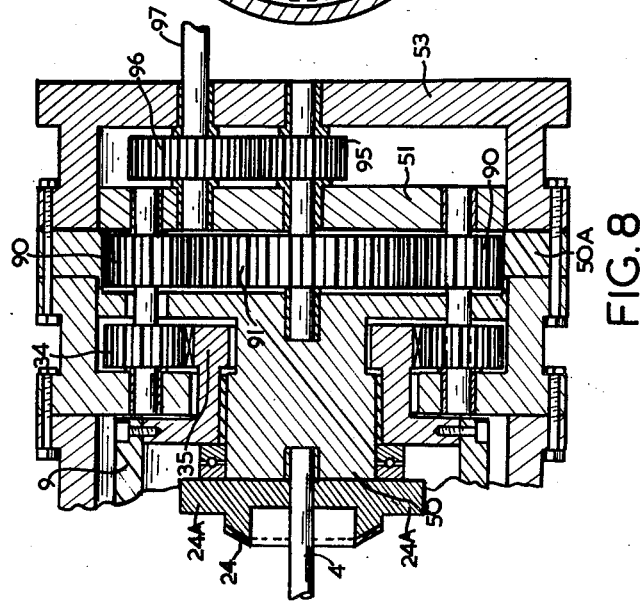
FIG. 8 is a view at the right hand end of the output cylinder showing another alternative transmission from the output cylinder to the output shaft.

FIGS. 7 and 8 illustrate two particular forms of input-output adaptor gearing for use when the drive is taken from the end of rotating cylindrical drive 9. This adaptor gearing and the output take-off shafts 54 or 97 can be positioned radially so that the output shaft is either at or off the centre line of the variable transmission power plant. In FIG. 7 the adapting ratio changing gears 43 and 44 and their shaft bearings are accommodated in an added end casing member 53 through which the final output shaft 54 is extended. In FIG. 8 the final ratio changing gears 95 and 96 and their shaft bearings are similarly accommodated in an added end casing member 53 through which the final output shaft 97 is taken off centre.

Figure 10:
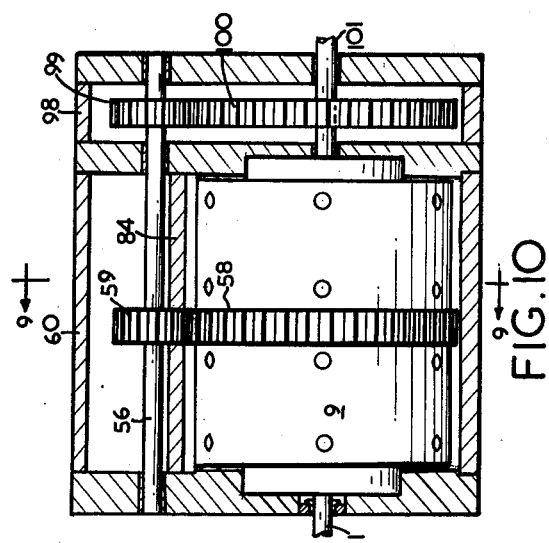
FIG. 10 is a sectional elevation corresponding to FIG. 9.

FIGS. 10, 11, 12 illustrate another particular form of input-output adaptor gearing for use when the drive is taken from gear 58 affixed centrally to the external surface of cylindrical drive 9. These adaptor gears 99, 100 or 99, 102, 100 and their shafts are accommodated in an added external casing member 98 and they can be positioned so that the final output shaft 101 is either at or off the centre line of the variable transmission power plant.

What I claim is:

1. Transmission mechanism comprising a hollow casing, an input shaft extending into the casing at one end, a sun wheel secured on the input shaft within the casing, a first fixed member forming part of the casing and surrounding the input shaft between the sun wheel and the input end of the casing, a hypoid type gear carried by the inner face of the fixed member substantially coaxial with the input shaft, a first gear carrier rotatable on the input shaft between the sun wheel and the fixed member, a hypoid type gear substantially coaxial with the input shaft carried on the face of the first gear carrier opposite the gear carrying face of the fixed member, a hollow cylindrical shaft carrier rotatable on the first fixed member and the first gear carrier and substantially coaxial with the input shaft, two spaced pinion carrier shafts in the shaft carrier between the first fixed member and the first gear carrier and rotatably mounted at their ends in the shaft carrier, two spaced hypoid type pinions on each carrier shaft, one meshing with the fixed member gear and the other with the first gear carrier gear, a second gear carrier rotatable on the input shaft on the opposite side of the sun wheel from the first gear carrier, a hypoid type gear substantially coaxial with the input shaft carried on the face of the second gear carrier remote from the sun wheel, a second fixed member surrounding the input shaft on the side of the second gear carrier remote from the sun wheel, a hypoid type gear substantially coaxial with the input shaft carrier on the face of the second fixed member adjacent to the second gear carrier, a second hollow cylindrical shaft carrier similar to the first and rotatable on the second gear carrier and second fixed member and substantially coaxial with the input shaft, two additional spaced pinion carrier shafts in the second shaft carrier between the second fixed member and the second gear carrier and rotatably mounted at their ends in the second shaft carrier, two spaced hypoid type pinions on each additional shaft, one meshing with the second fixed member gear and the other with a second gear carrier gear, spaced planetary shafts substantially parallel to the input shaft and substantially equally radially spaced from it, each mounted on and between the first and second gear carriers, a planetary gear on each planetary shaft adapted to be driven by the sun gear, an output power take-off cylinder surrounding the shaft carriers and sun and planet gears and rotatable in the casing and an internal gear on the output cylinder meshing with the planetary gears.

2. Transmission mechanism as claimed in claim 1 and further comprising means for transmitting motion from the output cylinder to an output shaft comprising internal and external ring gears on the cylinder near one end and substantially coaxial with the axis of rotation of the cylinder, a shaft outside the external ring gear and substantially parallel to the said axis, a gear fixed to the outside shaft and meshing with the external ring gear, a gear loosely mounted on the outside shaft, a clutch member mounted on the outside shaft and rotatable with it and displaceable along it to engage or disengage the loose gear, a shaft inside the internal ring gear and substantially parallel to the said axis, a gear loosely mounted on the inside shaft and meshing with the internal ring gear, a gear fixed on the inside shaft, a second clutch member mounted on the inside shaft and rotatable with it and displaceable along it to engage or disengage the inside shaft loose gear, means for displacing one clutch or the other at a time into or out of engagement with its loose gear, and a fifth gear fixed to an intermediate shaft and coupled to the output shaft, the fifth gear meshing with the outer shaft loose gear and the inner shaft fixed gear.

3. Transmission mechanism as claimed in claim 1 and further comprising means for transferring motion from the output cylinder to an output shaft comprising a driven shaft, means for transforming motion from the cylinder to the driven shaft, two spaced gears loosely mounted on the driven shaft, a clutch member mounted on the shaft between the spaced gears and rotatable with it and displaceable along it, means for displacing the clutch along the shaft simultaneously to engage or disengage one gear and disengage or engage the other, an output shaft substantially parallel to the driven shaft, two spaced gears fixed on the output shaft, one meshing with one input shaft loose gear and a fifth gear meshing with the remaining fixed and loose gears.

4. Transmission means as in claim 1 wherein the two shafts in each shaft carrier are substantially parallel and in a plane substantially at right angles to the input shaft.

5. Transmission mechanism as in claim 4 including means for circulating lubricant liquid within the casing for lubrication cooling and braking.

6. Transmission mechanism as in claim 4 wherein the four shafts carried by the shaft carriers are coupled to the input shaft for additional or alternative braking.

7. Transmission mechanism as claimed in claim 4 and further comprising means for transmitting motion from the output cylinder to an output shaft comprising internal and external ring gears on the cylinder near one end and substantially coaxial with the axis of rotation of the cylinder, a shaft outside the external ring gear and substantially parallel to the said axis, a gear fixed to the outside shaft and meshing with the external ring gear, a gear loosely mounted on the outside shaft, a clutch member mounted on the outside shaft and rotatable with it and displaceable along it to engage or disengage the loose gear, a shaft inside the internal ring gear and substantially parallel to the said axis, a gear loosely mounted on the inside shaft and meshing with the internal ring gear, a gear fixed on the inside shaft, a second clutch member mounted on the inside shaft and rotatable with it and displaceable along it to engage or disengage the inside shaft loose gear, means for displacing one clutch or the other at a time into or out of engagement with its loose gear, and a fifth gear fixed to an intermediate shaft and coupled to the output shaft, the fifth gear meshing with the outer shaft loose gear and the inner shaft fixed gear.

8. Transmission mechanism as claimed in claim 4 and further comprising means for transferring motion from the output cylinder to an output shaft comprising a driven shaft, means for transforming motion from the cylinder to the driven shaft, two spaced gears loosely mounted on the driven shaft, a clutch member mounted on the shaft between the spaced gears and rotatable with it and displaceable along it, means for displacing the clutch along the shaft simultaneously to engage or disengage one gear and disengage or engage the other, an output shaft substantially parallel to the driven shaft, two spaced gears fixed on the output shaft, one meshing with one input shaft loose gear and a fifth gear meshing with the remaining fixed and loose gears.

9. Transmission means as in claim 1 wherein the two shafts in each shaft carrier are inclined at substantially equal angles in opposite directions to a transverse plane intersecting the input shaft at right angles.

10. Transmission mechanism as in claim 9 including means for circulating lubricant liquid within the casing for lubrication cooling and braking.

11. Transmission mechanism as in claim 9 wherein the four shafts carried by the shaft carriers are coupled to the input shaft for additional or alternative braking.

12. Transmission mechanism as claimed in claim 9 and further comprising means for transmitting motion from the output cylinder to an output shaft comprising internal and external ring gears on the cylinder near one end and substantially coaxial with the axis of rotation of the cylinder, a shaft outside the external ring gear and substantially parallel to the said axis, a gear fixed to the outside shaft and meshing with the external ring gear, a gear loosely mounted on the outside shaft, a clutch member mounted on the outside shaft and rotatable with it and displaceable along it to engage or disengage the loose gear, a shaft inside the internal ring gear and substantially parallel to the said axis, a gear loosely mounted on the inside shaft and meshing with the internal ring gear, a gear fixed on the inside shaft, a second clutch member mounted on the inside shaft and rotatable with it and displaceable along it to engage or disengage the inside shaft loose gear, means for displacing one clutch or the other at a time into or out of engagement with its loose gear, and a fifth gear fixed to an intermediate shaft and coupled to the output shaft, the fifth gear meshing with the outer shaft loose gear and the inner shaft fixed gear.

13. Transmission mechanism as claimed in claim 9 and further comprising means for transferring motion from the output cylinder to an output shaft comprising a driven shaft, means for transforming motion from the cylinder to the driven shaft, two spaced gears loosely mounted on the driven shaft, a clutch member mounted on the shaft between the spaced gears and rotatable with it and displaceable along it, means for displacing the clutch along the shaft simultaneously to engage or disengage one gear and disengage or engage the other, an output shaft substantially parallel to the driven shaft, two spaced gears fixed on the output shaft, one meshing with one input shaft loose gear and a fifth gear meshing with the remaining fixed and loose gears.

14. Transmission mechanism as in claim 1 including means for circulating lubricant liquid within the casing for lubrication cooling and braking.

15. Transmission mechanism as in claim 14 wherein the four shafts carried by the shaft carriers are coupled to the input shaft for additional or alternative braking.

16. Transmission mechanism as claimed in claim 14 and further comprising means for transmitting motion from the output cylinder to an output shaft comprising internal and external ring gears on the cylinder near one end and substantially coaxial with the axis of rotation of the cylinder, a shaft outside the external ring gear and substantially parallel to the said axis, a gear fixed to the outside shaft and meshing with the external ring gear, a gear loosely mounted on the outside shaft, a clutch member mounted on the outside shaft and rotatable with it and displaceable along it to engage or disengage the loose gear, a shaft inside the internal ring gear and substantially parallel to the said axis, a gear loosely mounted on the inside shaft and meshing with the internal ring gear, a gear fixed on the inside shaft, a second clutch member mounted on the inside shaft and rotatable with it and displaceable along it to engage or disengage the inside shaft loose gear, means for displacing one clutch or the other at a time into or out of engagement with its loose gear, and a fifth gear fixed to an intermediate shaft and coupled to the output shaft, the fifth gear meshing with the outer shaft loose gear and the inner shaft fixed gear.

17. Transmission mechanism as claimed in claim 14 and further comprising means for transferring motion from the output cylinder to an output shaft comprising a driven shaft, means for transforming motion from the cylinder to the driven shaft, two spaced gears loosely mounted on the driven shaft, a clutch member mounted on the shaft between the spaced gears and rotatable with it and displaceable along it, means for displacing the clutch along the shaft simultaneously to engage or disengage one gear and disengage or engage the other, an output shaft substantially parallel to the driven shaft, two spaced gears fixed on the output shaft, one meshing with one input shaft loose gear and a fifth gear meshing with the remaining fixed and loose gears.

18. Transmission mechanism as in claim 1 wherein the four shafts carried by the shaft carriers are coupled to the input shaft for additional or alternative braking.

19. Transmission mechanism as claimed in claim 18 and further comprising means for transmitting motion from the output cylinder to an output shaft comprising internal and external ring gears on the cylinder near one end and substantially coaxial with the axis of rotation of the cylinder, a shaft outside the external ring gear and substantially parallel to the said axis, a gear fixed to the outside shaft and meshing with the external ring gear, a gear loosely mounted on the outside shaft, a clutch member mounted on the outside shaft and rotatable with it and displaceable along it to engage or disengage the loose gear, a shaft inside the internal ring gear and substantially parallel to the said axis, a gear loosely mounted on the inside shaft and meshing with the internal ring gear, a gear fixed on the inside shaft, a second clutch member mounted on the inside shaft and rotatable with it and displaceable along it to engage or disengage the inside shaft loose gear, means for displacing one clutch or the other at a time into or out of engagement with its loose gear, and a fifth gear fixed to an intermediate shaft and coupled to the output shaft, the fifth gear meshing with the outer shaft loose gear and the inner shaft fixed gear.

20. Transmission mechanism as claimed in claim 18 and further comprising means for transferring motion from the output cylinder to an output shaft comprising a driven shaft, means for transforming motion from the cylinder to the driven shaft, two spaced gears loosely mounted on the driven shaft, a clutch member mounted on the shaft between the spaced gears and rotatable with it and displaceable along it, means for displacing the clutch along the shaft simultaneously to engage or disengage one gear and disengage or engage the other, an output shaft substantially parallel to the driven shaft, two spaced gears fixed on the output shaft, one meshing with one input shaft loose gear and a fifth gear meshing with the remaining fixed and loose gears.

References Cited by the Examiner

UNITED STATES PATENTS

| | | | |
|---|---|---|---|
| 831,974 | 9/06 | Muller | 74—377 |
| 1,879,921 | 9/32 | Clohecy | 74—790 |
| 2,120,953 | 6/38 | Bear | 74—793 |
| 2,403,381 | 7/46 | Lawrence | 74—790 |
| 2,727,402 | 12/55 | Thoresen | 74—332 |

FOREIGN PATENTS

| | | |
|---|---|---|
| 967,342 | 3/50 | France. |
| 994,811 | 8/51 | France. |
| 1,081,501 | 7/53 | France. |

DON A. WAITE, *Primary Examiner.*